(12) United States Patent
Bowler et al.

(10) Patent No.: US 12,493,403 B2
(45) Date of Patent: Dec. 9, 2025

(54) AMPLIFIER FOR EXTENDED SPECTRUM DOCSIS

(71) Applicant: ARRIS Enterprises LLC, Horsham, PA (US)

(72) Inventors: David B. Bowler, Stow, MA (US); Jeffrey A. Boast, Colmar, PA (US); Michael R. Morisseau, Lowell, MA (US); Samuel D. Francois, Lowell, MA (US); Brent D. Arnold, Doylestown, PA (US)

(73) Assignee: ARRIS Enterprises LLC, Horsham, PA (US)

( * ) Notice: Subject to any disclaimer, the term of this patent is extended or adjusted under 35 U.S.C. 154(b) by 70 days.

(21) Appl. No.: 18/424,482

(22) Filed: Jan. 26, 2024

(65) Prior Publication Data

US 2024/0267082 A1    Aug. 8, 2024

Related U.S. Application Data

(60) Provisional application No. 63/625,210, filed on Jan. 25, 2024, provisional application No. 63/501,344, filed on May 10, 2023, provisional application No. 63/441,389, filed on Jan. 26, 2023, provisional application No. 63/441,416, filed on Jan. 26, 2023.

(51) Int. Cl.
| | |
|---|---|
| *G06F 3/04847* | (2022.01) |
| *G06F 3/04817* | (2022.01) |
| *H04B 3/04* | (2006.01) |
| *H04L 12/28* | (2006.01) |
| *H04N 7/10* | (2006.01) |

(52) U.S. Cl.
CPC ...... *G06F 3/04847* (2013.01); *G06F 3/04817* (2013.01); *H04B 3/04* (2013.01); *H04L 12/2801* (2013.01); *H04N 7/102* (2013.01)

(58) Field of Classification Search
None
See application file for complete search history.

(56) References Cited

U.S. PATENT DOCUMENTS

| | | | |
|---|---|---|---|
| 5,724,344 A | 3/1998 | Beck | |
| 6,285,252 B1 * | 9/2001 | Huang | H03F 1/3229 330/149 |

(Continued)

FOREIGN PATENT DOCUMENTS

| | | | | |
|---|---|---|---|---|
| AU | 2022305086 A1 * | 1/2024 | | H04L 5/0094 |
| CA | 2900804 A1 * | 8/2014 | | H04B 7/0413 |

(Continued)

OTHER PUBLICATIONS

Frank O'Keeffe et al., Full Duplex DOCSIS & Extended Spectrum DOCSIS hold hands to form the 10G cableE network of the future, IBC, Oct. 17, 2019 (Year: 2019).*

(Continued)

*Primary Examiner* — Berhanu Tadese
(74) *Attorney, Agent, or Firm* — Chernoff, Vilhauer, McClung & Stenzel, LLP

(57) ABSTRACT

Systems and methods for amplifying signals propagated along a span of cable that imposes a loss tilt, and such that the loss tilt is canceled so as to provide unity gain, by modulating amplification as a function of frequency of an amplifier adjacent the span.

18 Claims, 27 Drawing Sheets

(56) References Cited

U.S. PATENT DOCUMENTS

| | | | | |
|---|---|---|---|---|
| 7,587,001 | B2* | 9/2009 | Hazani | H04B 7/2606 455/426.2 |
| 7,813,451 | B2* | 10/2010 | Binder | H04B 7/2606 455/313 |
| 8,001,579 | B2* | 8/2011 | Olson | H04N 7/17309 725/127 |
| 8,184,681 | B2* | 5/2012 | Binder | H04B 7/2606 455/313 |
| 8,514,915 | B2* | 8/2013 | Binder | H04B 7/2606 455/190.1 |
| 9,319,257 | B2* | 4/2016 | Campos | H04B 7/068 |
| 10,129,616 | B2* | 11/2018 | Maricevic | H04B 10/2589 |
| 10,727,880 | B1 | 7/2020 | Pratt | H04B 3/04 |
| 10,749,551 | B1* | 8/2020 | Finkelstein | H04B 1/405 |
| 10,771,109 | B1* | 9/2020 | Jin | H04B 3/08 |
| 11,296,911 | B2* | 4/2022 | Finkelstein | H04L 12/6418 |
| 11,689,397 | B2* | 6/2023 | Finkelstein | H04L 5/0007 370/329 |
| 11,838,070 | B2* | 12/2023 | Hewavithana | H04N 7/102 |
| 11,863,145 | B1* | 1/2024 | Celedon | H03G 3/3068 |
| 12,028,125 | B2* | 7/2024 | Strobel | H04L 5/006 |
| 12,088,490 | B2* | 9/2024 | Thompson | H04L 43/0876 |
| 12,199,673 | B2* | 1/2025 | Maricevic | H04N 7/22 |
| 2007/0173202 | A1 | 7/2007 | Binder | H04B 7/2606 455/276.1 |
| 2008/0040764 | A1* | 2/2008 | Weinstein | H04N 7/102 725/119 |
| 2008/0146146 | A1* | 6/2008 | Binder | H04B 7/2606 455/20 |
| 2011/0206088 | A1* | 8/2011 | Binder | H04B 7/15528 375/136 |
| 2012/0236906 | A1* | 9/2012 | Binder | H04B 7/15542 375/136 |
| 2013/0279417 | A1* | 10/2013 | Binder | H04B 7/2606 370/328 |
| 2017/0302254 | A1* | 10/2017 | McNamara | H04L 27/01 |
| 2020/0252249 | A1* | 8/2020 | Finkelstein | H04L 12/6418 |
| 2021/0351899 | A1* | 11/2021 | Shelby | H04B 3/21 |
| 2022/0224573 | A1* | 7/2022 | Finkelstein | H04L 25/08 |
| 2022/0345788 | A1* | 10/2022 | Mäki | H03G 9/00 |
| 2023/0090396 | A1* | 3/2023 | Thompson | H04L 41/082 375/257 |
| 2023/0144817 | A1* | 5/2023 | Hewavithana | H04B 3/38 455/400 |
| 2023/0155804 | A1* | 5/2023 | Maricevic | H04L 5/1423 370/276 |
| 2024/0214008 | A1* | 6/2024 | Williams | H04B 1/0075 |
| 2024/0256113 | A1* | 8/2024 | Bowler | G06F 3/04817 |
| 2024/0267082 | A1* | 8/2024 | Bowler | G06F 3/04883 |

FOREIGN PATENT DOCUMENTS

| | | | | |
|---|---|---|---|---|
| CA | 2946291 C | * | 4/2020 | H04N 7/104 |
| CA | 3212083 A1 | * | 9/2022 | H04B 3/143 |
| CA | 3224463 A1 | * | 1/2023 | H04L 5/0094 |
| CN | 1402438 A | * | 3/2003 | |
| CN | 101401345 A | * | 4/2009 | H04B 7/15528 |
| CN | 102723983 B | * | 9/2015 | H04B 7/15528 |
| CN | 105680906 A | * | 6/2016 | H04B 3/38 |
| CN | 205725743 U | * | 11/2016 | |
| CN | 106572038 A | * | 4/2017 | H04L 25/03878 |
| CN | 110325929 A | * | 10/2019 | H04L 63/1416 |
| CN | 106572038 B | * | 9/2020 | H04L 25/03878 |
| CN | 110325929 B | * | 5/2021 | H04L 12/40 |
| CN | 115152152 A | * | 10/2022 | H04B 3/38 |
| CN | 115804015 A | * | 3/2023 | H04L 5/14 |
| EP | 2315387 A2 | * | 4/2011 | H04B 7/15528 |
| JP | 2008061086 A | * | 3/2008 | |
| JP | 2008219841 A | * | 9/2008 | |
| JP | 2019118117 A | * | 7/2019 | H04B 7/0697 |
| KR | 100861682 B1 | * | 10/2008 | H04B 10/25751 |
| KR | 20080106178 A | * | 12/2008 | H04B 7/15528 |
| KR | 20150128729 A | * | 11/2015 | H04B 7/0697 |
| KR | 20210013738 A | * | 2/2021 | G06Q 50/184 |
| KR | 20210014705 A | * | 2/2021 | G06Q 50/10 |
| TW | 1589132 B | * | 6/2017 | H04N 7/22 |
| TW | 202224376 A | * | 6/2022 | H04B 3/21 |
| TW | 1785594 B | * | 12/2022 | H04L 5/14 |
| WO | WO-0124359 A1 | * | 4/2001 | H03F 1/3241 |
| WO | WO-2007000777 A1 | * | 1/2007 | H04B 3/542 |
| WO | WO-2007080592 A1 | * | 7/2007 | H04B 7/15528 |
| WO | WO-2008117311 A1 | * | 10/2008 | H04B 3/54 |
| WO | WO-2014127317 A1 | * | 8/2014 | H04B 7/0413 |
| WO | WO-2015164042 A1 | * | 10/2015 | H04N 7/104 |
| WO | WO-2020176580 A1 | * | 9/2020 | H04B 3/04 |
| WO | WO-2021201817 A1 | * | 10/2021 | H04B 3/38 |
| WO | WO-2021226046 A2 | * | 11/2021 | H04L 5/14 |
| WO | WO-2023278730 A1 | * | 1/2023 | H04L 12/4625 |
| WO | WO-2024159170 A1 | * | 8/2024 | H04L 12/2801 |
| WO | WO-2024159188 A1 | * | 8/2024 | H04L 12/2801 |
| WO | WO-2024159170 A9 | * | 1/2025 | H04L 12/2801 |

OTHER PUBLICATIONS

International Search Report and Written Opinion RE: Application No. PCT/US2024/013220, dated May 31, 2024.

N/a: "Diamond (TM) Line Type 1 and Type 2 Amplifiers, Reference & Installation Manual (Doc. 2244002, Rev. D)", C-Cor Corp., Jun. 1, 2003 (Jun. 1, 2003), pp. 1-120, XP055380289, Retrieved from the Internet: URL: https://www.c-cpr/cp,/au/products/ [retrieved on Jun. 9, 2017] p. 34-p. 36; figure 13).

* cited by examiner

| Downstream Parameter | | Specification |
|---|---|---|
| Frequency Split, MHz[1] | 042 Split | 54-1218 |
| | 065 Split | 85-1218 |
| | 085 Split | 102-1218 |
| | 204 Split | 258-1218 |
| Flatness, dB[2] | | ±0.75 |
| Operational Gain, dB[3] | | 47 |
| Internal Slope (Slope Option X), dB[4] | 042 Split | 16.1 |
| | 065 Split | 15.2 |
| | 085 Split | 14.7 |
| | 204 Split | 11.5 |

| File | Edit | Mode | Tools | Global Change | | Spec Edit | | Test | Misc | | Reports |
|---|---|---|---|---|---|---|---|---|---|---|---|
| □ | ☞ | 🖫 | ⇤ ⇥ ✚ ━ 🗋 ↝ ⤬ 🖳 | EQ | Auto ▼ | OP | Off ▼ | DEV | | | |
| 0 Alter | | 1 Jump | | 2 Forward | | 3 Carry | | 4 Fwd2A | 5 Test | | 6 WillWrk |
| .0 Break | | .1 Join | | .2 BkFeed | | .3 UnBkFD | | .4 XFd2A | .5 MoveCpl | | .6 XWillWK |
| ..0 SpcVw | | ..1 Xspec | | ..2 FwdFd | | ..3 UnFFd | | ..4 BrLabel | ..5 Dsmry | | ..6 Clear |
| Node | 1794 | 492 | 396 | 108 | ftg | hc | cab | iv | Amp | TSG |
| 1 | 55.53 | 37.51 | 8.75 | 8.38 | 75 | | 411 | | | |
| 2 | 49.73 | 33.01 | 13.15 | 12.48 | 0 | 2 | 411 | | | |
| 3 | 43.39 | 29.83 | 16.05 | 14.30 | 140 | | 101 | | | |
| 4 | 33.77 | 23.67 | 21.93 | 18.13 | 192 | 2 | 401 | | | |
| 5 | 25.23 | 18.09 | 27.13 | 22.35 | 140 | 2 | 401 | | | |
| 6 | 15.85 | 11.54 | 33.29 | 27.50 | 144 | | 401 | | 31 | |
| 7 | 57.40 | 38.41 | 8.00 | 8.00 | 0 | 2 | 401 | | | |
| 8 | 52.31 | 35.87 | 10.32 | 9.46 | 108 | | 401 | | | |
| 9 | 44.39 | 30.51 | 15.50 | 12.92 | 145 | 2 | 401 | | | |
| 10 | 33.67 | 23.19 | 22.42 | 18.88 | 95 | 1 | 401 | | | |
| 11 | 28.73 | 19.31 | 26.12 | 22.30 | 40 | | 401 | | | |
| 12 | 24.12 | 17.14 | 28.04 | 23.33 | 128 | | 401 | | | |
| 13 | 22.50 | 16.37 | 28.72 | 23.69 | 45 | | 401 | | 32 | |
| 14 | 57.40 | 38.41 | 8.00 | 8.00 | 0 | 1 | 401 | | | |
| 15 | 54.69 | 37.00 | 9.33 | 8.94 | 42 | 4 | 401 | | | |
| 16 | 50.53 | 34.75 | 11.31 | 10.32 | 85 | 4 | 401 | | | |
| 17 | 45.44 | 32.10 | 13.76 | 12.99 | 97 | 4 | 401 | | | |
| 18 | 39.69 | 28.72 | 16.86 | 15.34 | 93 | 4 | 401 | | | |
| 19 | 34.16 | 25.24 | 20.16 | 17.93 | 87 | 4 | 401 | | | |
| 20 | 26.55 | 19.53 | 25.70 | 22.84 | 89 | | 401 | | 33 | |
| 21 | 57.40 | 38.41 | 8.00 | 8.00 | 0 | 4 | 401 | | | |
| 22 | 52.92 | 36.01 | 10.11 | 9.45 | 94 | 4 | 401 | | | |
| 23 | 48.54 | 33.67 | 12.18 | 10.88 | 91 | 2 | 401 | | | |
| 24 | 42.09 | 30.43 | 15.12 | 12.72 | 143 | 2 | 401 | | | |
| 25 | 31.26 | 23.07 | 22.09 | 18.71 | 98 | 4 | 401 | | | |
| | 26.86 | 18.87 | 26.29 | 22.91 | 64 | | | | | |
| | | | 62 | | | | | | | |

*FIG. 4*

| View | | Help | | | | | | |
|---|---|---|---|---|---|---|---|---|
| Total Dev. ▼ | TSG | 1 ▼ | | | | | | |
| 7 AutoCpl | 8 Recalc | 9 Toggle | ./ Distance | | | | | |
| .0 SetMDU | .8 RotTap | .9 Copy | .+ Name | | | | | |
| ..7 CAwBF | ..8 XCAmp | ..9 LcKDStr | ..+ Notes | | | | | |
| tap1 | tap2 | tap3 | tap4 | Cplr[Branch] | Cplr[Branch] | 750 | 1002 | 1218 |
| | | | | 2[29] | | 41.06 | 44.58 | 47.50 |
| /23/ | | | | | | 36.36 | 39.58 | 42.30 |
| | | | | 8[13] | | 32.38 | 35.08 | 37.28 |
| /11/ | | | | | | 25.45 | 27.38 | 28.90 |
| /8/ | | | | | | 19.17 | 20.58 | 21.58 |
| | 24 | | | | | 11.90 | 12.88 | 13.45 |
| /26/ | | | | | | 42.18 | 44.85 | 49.00 |
| | | | | 8[16] | | 39.00 | 42.25 | 44.98 |
| /20/ | | | | 2[17] | | 33.11 | 35.73 | 37.92 |
| /11/ | | | | | | 25.12 | 27.05 | 28.66 |
| | | | | | | 21.04 | 22.75 | 24.14 |
| | | | | | | 18.23 | 19.55 | 20.55 |
| | 25 | | | | | 17.24 | 18.43 | 19.29 |
| /26/ | | | | | | 42.18 | 45.85 | 49.00 |
| /26/ | | | | | | 40.46 | 43.90 | 46.82 |
| /23/ | | | | | | 37.79 | 40.88 | 43.44 |
| /20/ | | | | | | 34.55 | 37.25 | 39.43 |
| /17/ | | | | | | 30.61 | 32.93 | 34.72 |
| /11/ | | | | | | 26.59 | 28.65 | 30.09 |
| | 26 | | | | | 20.43 | 22.23 | 23.40 |
| /26/ | | | | | | 42.18 | 45.85 | 49.00 |
| /26/ | | | | | | 39.31 | 42.60 | 45.37 |
| /23/ | | | | | | 36.51 | 39.43 | 41.82 |
| /20/ | | | | 2[18] | | 32.46 | 34.85 | 36.72 |
| /11/ | | | | | | 24.41 | 26.10 | 27.37 |
| 16.96 | 10.07 | 34.99 | 31.61 | | | 20.21 | 21.90 | 23.17 |

*FIG. 4 (Continued)*

| 21.03 | 13.99 | 31.13 | 26.35 | | | | |
| | | 33.29 | 27.50 | | 144 | | | 0 |
| | | | | | | | | 1-1 |
| (3) | | | | | | | | |
| 6 | | | | | | | | |
| | 57.40 | 38.41 | 8.00 | 8.00 | | | | |

| (JXP-0 : CEQ-CS03) | 15.07 | 16.48 | 17.48 |
|---|---|---|---|
| (JXP-8 : SRE-S0 ) | 11.90 | 12.88 | 13.45 |
| 0 476 691 17.14 24.05 24.05] | - | - | - |
| 116 691 | - | - | - |
| 0-6 476 | 42.18 | 45.85 | 49.00 |

FIG. 5A (Continued)

| 13 | 25.50 | 16.37 | 28.72 | 23.69 | 45 | | 32 | |
|---|---|---|---|---|---|---|---|---|
| (3) | - | - | - | - | | | | 0 |
| | - | - | - | - | | | | 1-2 |
| | - | - | - | - | | | L | |
| | 57.40 | 38.41 | 8.00 | 8.00 | 0 | | | |
| 14 | 57.40 | 38.41 | 8.00 | 8.00 | | | | |
| | | 10.21 | 36.30 | 36.80 | | | | 1 |

|   |   |   |   |   |   | 17.24 | 18.43 | 19.29 |
|---|---|---|---|---|---|---|---|---|
|   |   | ( | JXP- | 4: | CEQ-CS06) |   |   |   |
|   |   | ( | JXP- | 12: | SRE-S0 ) |   |   |   |
| 0 | 308 | 561 | 1252 | 11.09 | 20.20 44.25] |   |   |   |
| 0-2 | 40 | 308 |   |   |   | 42.18 | 45.85 | 49.00 |
|   |   |   |   |   |   | 42.18 | 45.85 | 17.48 |
|   |   |   |   |   |   | 14.28 | 18.15 | 21.70 |

*FIG. 5B (Continued)*

| | | | | 20.43 | 22.23 | 23.40 |
|---|---|---|---|---|---|---|
| 0.493 | | JXP-9: CEQ-EQ03) | | - | - | - |
| 0-1.19 | 493 | JXP-13: SRE-S-8 ) | 1745 17.75 17.75 62.00] | - | - | - |
| | | | | 42.18 | 45.85 | 49.00 |

FIG. 5C (Continued)

AMPLIFIER FOR EXTENDED SPECTRUM DOCSIS

CROSS REFERENCE TO RELATED APPLICATIONS

The present which claims priority to U.S. Provisional Application. No. 63/441,389 filed Jan. 26, 2023, U.S. Provisional Application. No. 63/441,416 filed Jan. 26, 2023, U.S. Provisional Application. No. 63/625,210 filed Jan. 25, 2024, and U.S. Provisional Application. No. 63/501,344 filed May 10, 2023, the contents of which are each incorporated herein by reference in their entirety.

BACKGROUND

The subject matter of this application relates to improved systems and methods that deliver CATV, digital, and Internet services to customers.

Cable Television (CATV) services historically have provided content to large groups of subscribers from a central delivery unit, called a "head end," which distributes channels of content to its subscribers from this central unit through a branch network comprising a multitude of intermediate nodes. Modern Cable Television (CATV) service networks, however, not only provide media content such as television channels and music channels to a customer, but also provide a host of digital communication services such as Internet Service, Video-on-Demand, telephone service such as VoIP, and so forth. These digital communication services, in turn, require not only communication in a downstream direction from the head end, through the intermediate nodes and to a subscriber, but also require communication in an upstream direction from a subscriber and to the content provider through the branch network.

To this end, such CATV head ends included a separate Cable Modem Termination System (CMTS), used to provide high speed data services, such as video, cable Internet, Voice over Internet Protocol, etc. to cable subscribers. Typically, a CMTS will include both Ethernet interfaces (or other more traditional high-speed data interfaces) as well as RF interfaces so that traffic coming from the Internet can be routed (or bridged) through the Ethernet interface, through the CMTS, and then onto the optical RF interfaces that are connected to the cable company's hybrid fiber coax (HFC) system. Downstream traffic is delivered from the CMTS to a cable modem in a subscriber's home, while upstream traffic is delivered from a cable modem in a subscriber's home back to the CMTS. Many modern CATV systems have combined the functionality of the CMTS with the video delivery system (EdgeQAM) in a single platform called the Converged Cable Access Platform (CCAP). Still other modern CATV architectures (referred to as Distributed Access Architectures or DAA) relocate the physical layer (e.g., a Remote PHY or R-PHY architecture) and sometimes the MAC layer as well (e.g., a Remote MACPHY or R-MAC-PHY architecture) of a traditional CCAP by pushing it/them to the network's fiber nodes. Thus, while the core in the CCAP performs the higher layer processing, the remote device in the node converts the downstream data sent by the core from digital-to-analog to be transmitted on radio frequency, and converts the upstream RF data sent by cable modems from analog-to-digital format to be transmitted optically to the core.

Regardless of which architectures were employed, historical implementations of CATV systems bifurcated available bandwidth into upstream and downstream transmissions i.e., data was only transmitted in one direction across any part of the spectrum. For example, early iterations of the Data Over Cable Service Interface Specification (DOCSIS) specified assigned upstream transmissions to a frequency spectrum between 5 MHz and 42 MHz and assigned downstream transmissions to a frequency spectrum between 50 MHz and 750 MHZ. Later iterations of the DOCSIS standard expanded the width of the spectrum reserved for each of the upstream and downstream transmission paths, the spectrum assigned to each respective direction did not overlap.

Still later iterations of the DOCSIS standard utilized Orthogonal Frequency Division Multiplexing (OFDM) as a cable data transmission format. The purpose of OFDM/OFDMA technology is to maximize the efficiency of data transmissions across a cable data network by optimizing the QAM modulation level used for each subcarrier of RF frequency bandwidth. Although originally defined for use directly in the downstream direction, OFDM technology was adapted for multiple access (Orthogonal Frequency Division with Multiple Access—OFDMA) for use in the upstream direction. In each direction, a relatively wide channel is subdivided into many small subcarriers. In the downstream direction, each of these subcarriers may use its own Quadrature Amplitude Modulation (QAM) level, which equates to a different bit capacity per subcarrier QAM symbol. In the upstream direction, groups of subcarriers are combined and, when time multiplexed, create the atomic unit of upstream bandwidth assignment known as a "minislot." In the upstream direction, all subcarriers of a minislot are assigned the same QAM level and thus all subcarriers of a minislot have the same bit capacity per QAM symbol.

Recently, cable operators have searched for additional alternative architectures to satisfy ever-increasing demand for both upstream and downstream services. One such proposed architecture, for example, is full duplex (FDX) DOCSIS technology. With FDX DOCSIS, upstream and downstream spectrum is no longer separated, allowing up to 5 Gbps upstream service and 10 Gbps downstream service over the cable access network. In a full duplex system, because the CCAP/R-PHY core knows the characteristics of its own downstream transmission, it can distinguish upstream communications transmitted in the same frequencies that it provides those downstream services. Full duplex technology, however, is unsuitable in the longer HFC plants that exist in most operators' networks. Furthermore, in FDX systems, subscribers must be organized into "interference groups" to mitigate interference in downstream transmissions to some subscribers caused by upstream transmissions by other subscribers, but the presence of amplifiers located between a customers' premises and the closest node inhibits the separation of those customers into groups because the amplifiers cause all subscribers to interfere with each other. Theoretically, this problem could be addressed by eliminating the amplifiers running fiber to each subscriber's premises, or including cancellation in the amplifiers, but both are costly.

Other proposed architectures would increase the spectrum of both services to customers in both upstream and downstream directions, moving the split between these services upwards. For example, the proposed DOCSIS 4.0 standard would extend the upper frequency of the downstream spectrum from 1218 MHz to 1794 MHz while moving the maximum split between the upstream and downstream services from 204/258 MHz to as high as 684/834 MHz. These architectures are often referred to as Extended Spectrum DOCSIS (ESD). Again, however, upgrading the equipment from the head end to the subscribers premises to accommodate the increase in bandwidth is expensive.

A common theme of all these evolutions of the CATV architecture is the need to provide ever increasing amounts of bandwidth. One deleterious influence on bandwidth is noise: as noise increases relative to signal strength, less of the available bandwidth becomes usable. In a typical CATV or other communications network, a signal is propagated over a transmission medium, such as an optical fiber or a coaxial cable, for often a great distance before reaching a customer. Signal degradation occurs over this length and is typically recovered using one or more amplifiers. Yet, amplification produces distortion, particularly as amplification grows large, and this distortion reduces the usable bandwidth of the system.

What is desired, therefore, are improved systems and methods for amplifying communications signals to reduce noise or other such degradations in the signal being amplified.

BRIEF DESCRIPTION OF THE DRAWINGS

For a better understanding of the invention, and to show how the same may be carried into effect, reference will now be made, by way of example, to the accompanying drawings, in which:

FIG. 4 shows exemplary performance metrics of the amplifier of FIG. 3.

FIGS. 5A-5C show an exemplary Lode tool analysis of different amplifiers and spans feeding those amplifiers.

DETAILED DESCRIPTION

Figures 1, 2A:
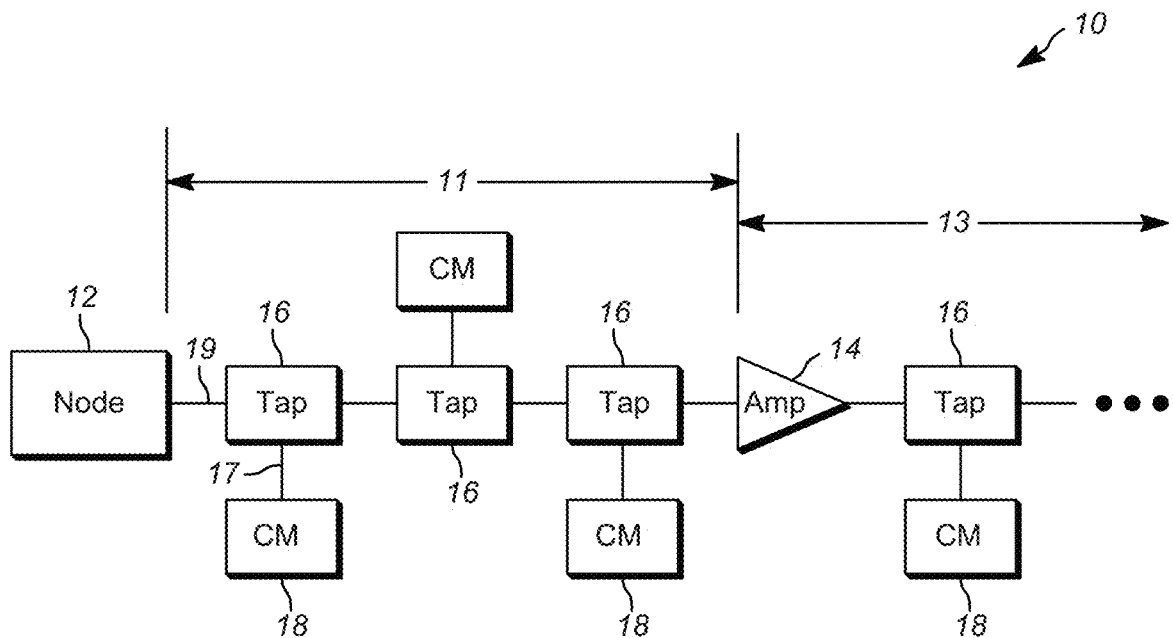
FIG. 1 shows a portion of an exemplary communications system in which a node supplies a signal to a large number of customers via a network of cables and amplifiers.
FIG. 2A shows specifications for an exemplary amplifier used in the system of FIG. 1.

FIG. 1 shows an exemplary communications network 10 that extends from a node 12 to a plurality of cable modems 18 in the homes of subscribers. Communications signals are propagated over the network via trunk cable 19, and each cable modem 18 is fed by a respective tap 16 and feeder cable 17. The system 10 shown in FIG. 1 may be an HFC system as previously described, where the node 12 is served by a head end having a CCAP (not shown), or alternately the node 12 may be one in a DAA architecture, e.g., an RPD, RMD, etc. The cable 17, 19 may comprise coaxial cable, although those of ordinary skill in the art will appreciate that other transmission media may be used, such as fiber optic cable, and that although the system 10 does not show the cabling between the node 12 and any devices upstream from the node e.g., a head end, another node, etc. may also benefit from the systems and methods disclosed in the present application.

The system of FIG. 1 also utilizes one or more amplifiers 14, which are necessary because the signal that propagates along cable 19 degrades over the cable length and is also degraded by the passive elements along the cable 19, such as taps 16. This necessitates the periodic spacing of amplifiers along the length of the cable to recover the signal.

As explained in more detail below, the amplifiers 14 are typically designed to achieve "unity gain," meaning that the amplifiers have an amplification intended to recover the signal to the same level that it would have been were it not for the degradation caused while the signal travels along the span between the given amplifier and an adjacent active (i.e., amplification) device such as another amplifier 14 or node 12. Achieving unity gain is complicated by the fact that signal loss or attenuation over a span varies as a function of frequency, where more signal loss occurs at high frequencies than at low frequencies. Thus, the span 11 between the node 12 and the first amplifier 14 shown in FIG. 1, for example, will not only likely have a different amount of loss than the successive span 13 between amplifier 14 and the next sequential amplifier, but the loss within span 11 will vary as a function of frequency.

Existing amplifiers, however, do not have a variable gain: rather, they each run at maximum gain, and as part of their set-up and balancing process a technician inserts padding (attenuation) and signal conditioning (equalization or cable simulation) at the input of the amplifier, which adds even more loss in an amount required so that, when it augments the loss in the adjacent span over which the signal travels, the amplifier—when operating at maximum gain, achieves unity gain across the relevant spectrum.

An example illustrates this process. Consider FIG. 2A, which shows specifications for an examplary "bridger" amplifier. In this example, assume that the system 10 is operating in a "high split" configuration where upstream signals are propagated in the 5-204 MHz frequency range, while downstream signals are propagated in the 258-1218 MHz frequency range. The amplifier in this example shows an operational gain of 47 dB and an internal tilt of 11.5 dB, which means that the gain at 258 MHz is 35.5 MHz (47 dB-11.5 dB).

Figure 2B:
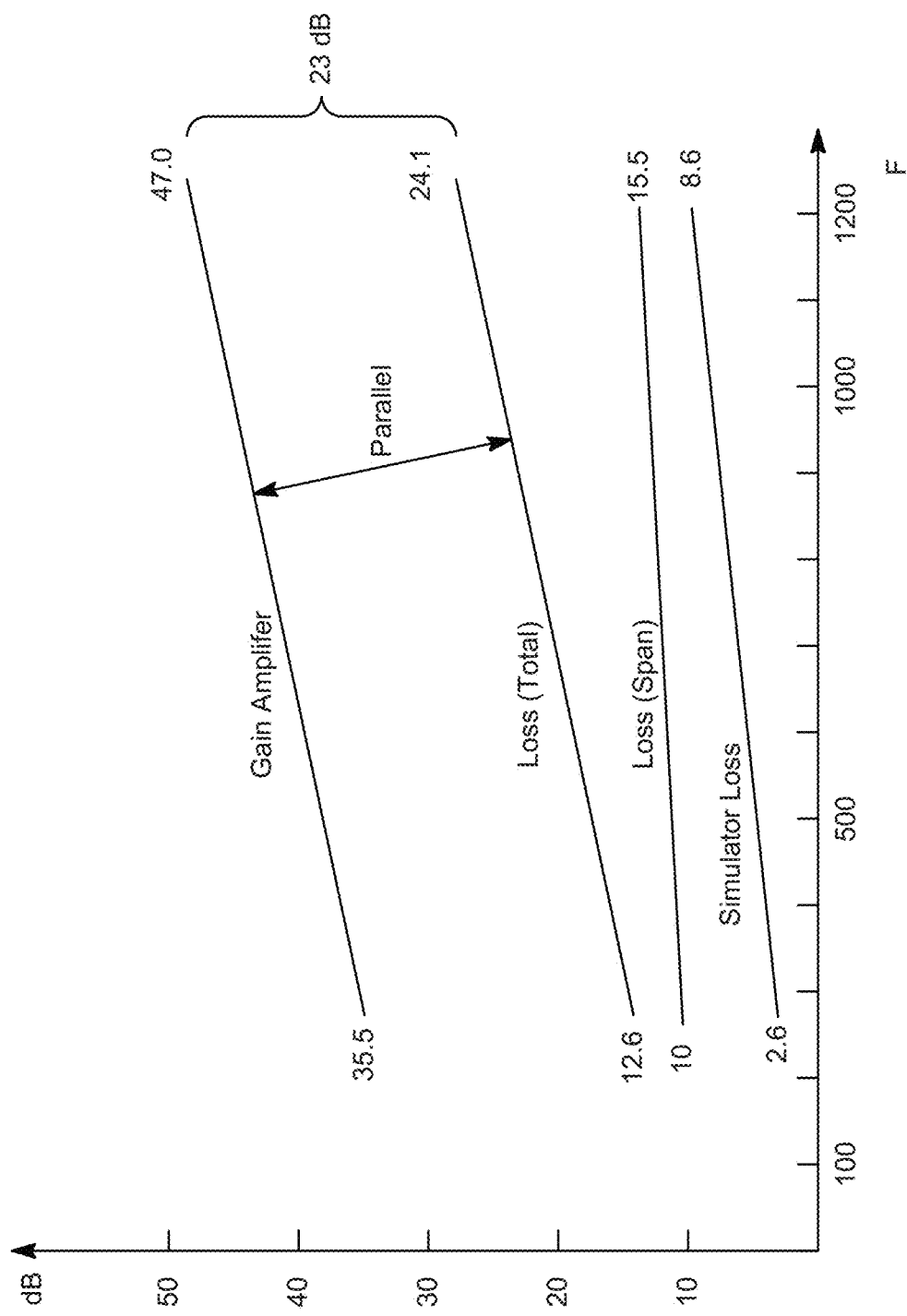
FIG. 2B shows the manner in which an amplifier, with the specifications shown in FIG. 2A, may compensate for line losses in the span preceding it, in order to achieve unity gain.

For this example, also assume that the span (e.g., span 11 of FIG. 1) preceding the amplifier (e.g., amplifier 14 of FIG. 1) imposes a loss of 10 dB at 258 MHz and 15.5 dB at 1218 MHz. As shown in FIG. 2B, in order to achieve "unity gain" for this amplifier, across the downstream spectrum, the downstream signal may be "conditioned" by linearly adding 2.6 dB of loss at 258 MHz and 8.6 dB of loss at 1218 MHz. When so conditioned, this loss, added to the existing span loss, produces a loss "tilt" that is parallel to that of the gain of the amplifier. However, the gain of the amplifier is still too large for the desired "unity gain," hence an additional attenuation of approximately 23 dB must be added across the downstream spectrum. Once this is accomplished, the loss of the signal feeding the amplifier is such that the amplifier achieves unity gain across the spectrum of the downstream signal.

Although, in this example, the equalizer or cable simulator added loss that increased as a function of frequency, those of ordinary skill in the art will understand that this merely results from the fact that the example given shows a span loss with a tilt less than that of the amplifier. In a situation where a span exhibits sufficiently heavy losses that its tilt over the downstream frequency is more than that of the amplifier, the signal conditioning would have to add equalization that exhibits more loss at lower frequencies than at higher frequencies.

Figure 3:
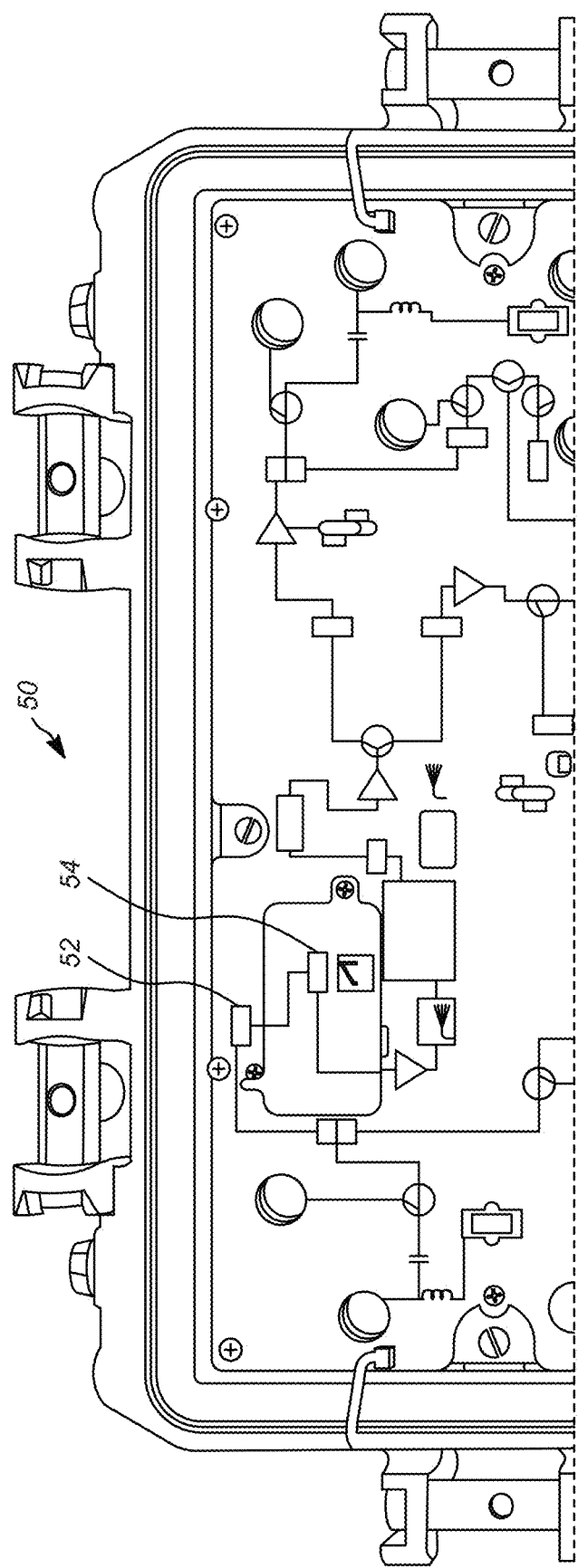
FIG. 3 shows an exemplary amplifier that implements the technique of FIG. 2B.

Mechanically, the required cable simulation and attenuation is incorporated into amplifier circuits as plug-in units before any of the amplifier gain stages. Referring to FIG. 3, for example, which shows an exemplary amplifier 50, a plug-in attenuator 52 may add a desired amount of attenuation (in the example above, 23 dB) and a plug-in simulator or equalizer 54 may add a desired amount of tilt to the signal (in the example above a tilt of 8.6 dB at 1218 MHz minus 2.6 dB at 258 MHz).

Although the foregoing example was described with respect to a downstream signal, a similar process occurs when amplifying an upstream signal, which will be described in more detail later in the specification. Specifically, in the upstream direction, signal conditioning is applied to a signal such that, when added to losses of an adjacent span, amplification of the signal produces unity gain.

The foregoing systems and methods, unfortunately, are not always successful at achieving unity gain. In particular, the tilt of span loss is exacerbated by extending the spectrum of a signal: because loss increases with frequency, when the frequency range or bandwidth of a communications channel is extended by for example, migrating to extended spectrum DOCSIS, the tilt associated with any span of a given length increases. This necessitates a greater amount of conditioning or equalization associated with a cable simulator in an amplifier. This means adding more loss using the plug-in units just described, and in some circumstances more loss may need to be added than can be recovered by the amplifier to achieve unity gain.

FIG. 4, for example, shows a screenshot 60 from an industry CAD simulation tool, Lode, which is a tool for designing CATV networks. In this example, a legacy network is being upgraded to support 1.8 GHz ESD. The left columns 62 show signal levels (dBmV) at the balancing frequencies of the network, while the columns 64 show the lengths and types of cables in a span of the network, and a count of taps along that span. For example, the screenshot 60 shows node 13 having an amplifier of type "32" (a line extender amplifier) being fed by a 45 foot section of 401-type cable, with a count of zero taps along that section. The columns 62 therefore show the input levels into the amplifier at each of the network's balancing frequencies.

Figure 5C:
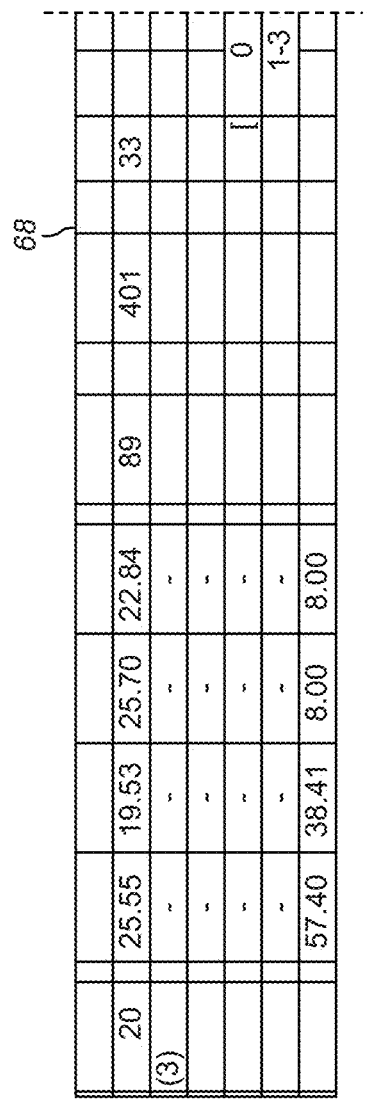

Referring also to FIGS. 5A to 5C, the Lode simulation shows three amplifiers, a "31-type" 66, a "32-type" 67, and a "33-type" 68. Specifically, the tool looks at all the losses, at each balancing frequency, through the intervening nodes feeding the amplifiers 67 and 68, and adding then together to arrive at the span loss into an amplifier, for which the amplifier must compensate. Then Lode selects from available attenuators and cable simulators to compensate for those span losses to achieve unity gain. Of these amplifiers, the amplifiers 67 and 68 are shown in green by Lode, which means that the tool shows these amplifiers as being able to balance the inputs to achieve unity gain. This can be seen in FIG. 4 by comparing the levels at node 14 to node 7, and at node 21 to node 14.

The amplifier 66, however, is shown by the tool in red. This means that Lode is unable to achieve the target levels that were feeding the 75-foot cable shown at node 1. This occurs because, after adding the conditioning needed to match the slope of the span losses preceding amplifier, over the large frequency range of the ESD downstream spectrum, the amplifier—even at its "maximum-amplification" and with no attenuation or padding required, cannot attain the required levels.

Figure 6:
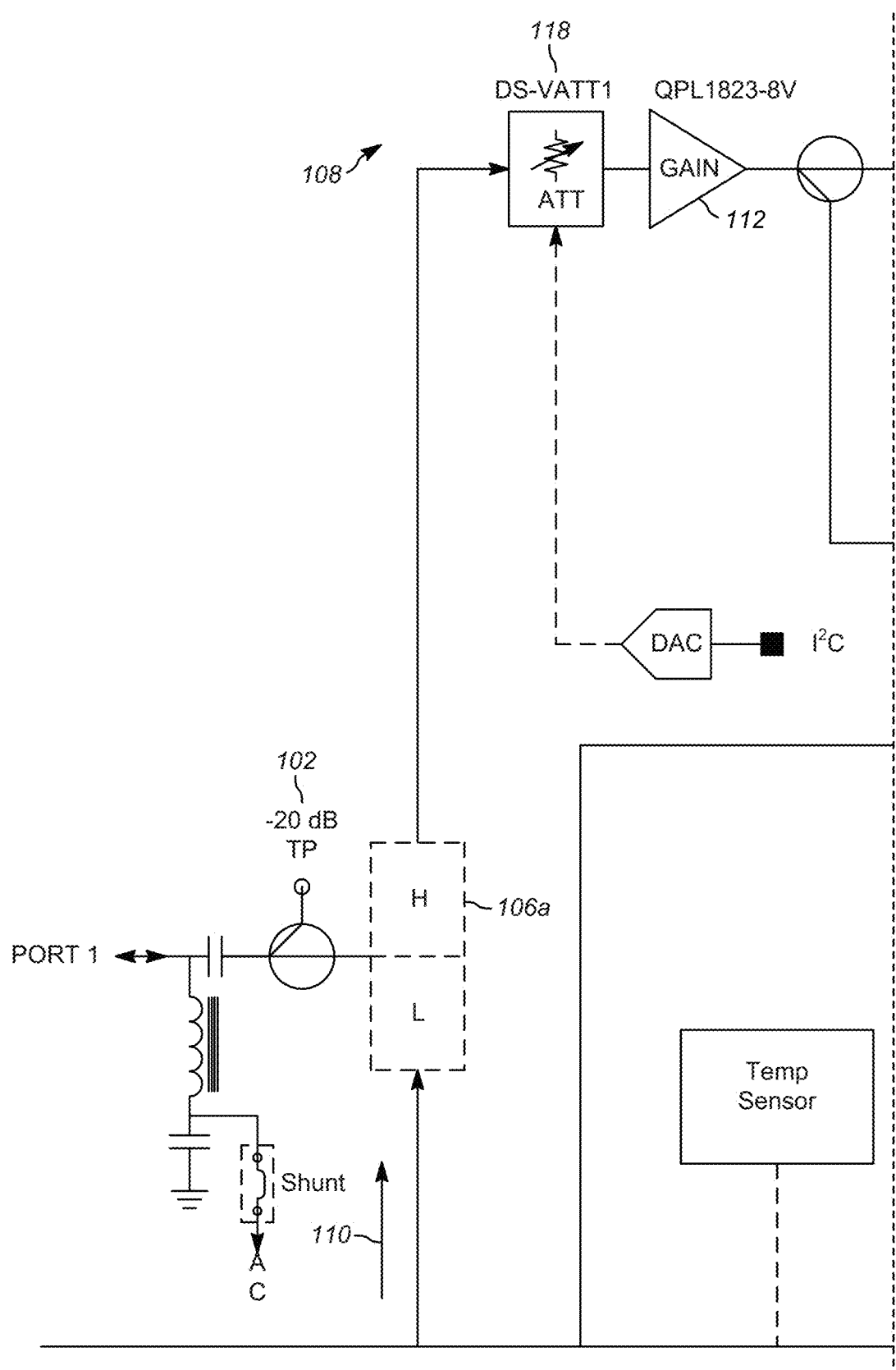
FIG. 6 shows a partial view of an amplifier according to an embodiment of the disclosure, with corresponding elements for amplifying and processing a downstream signal.
Figure 6:
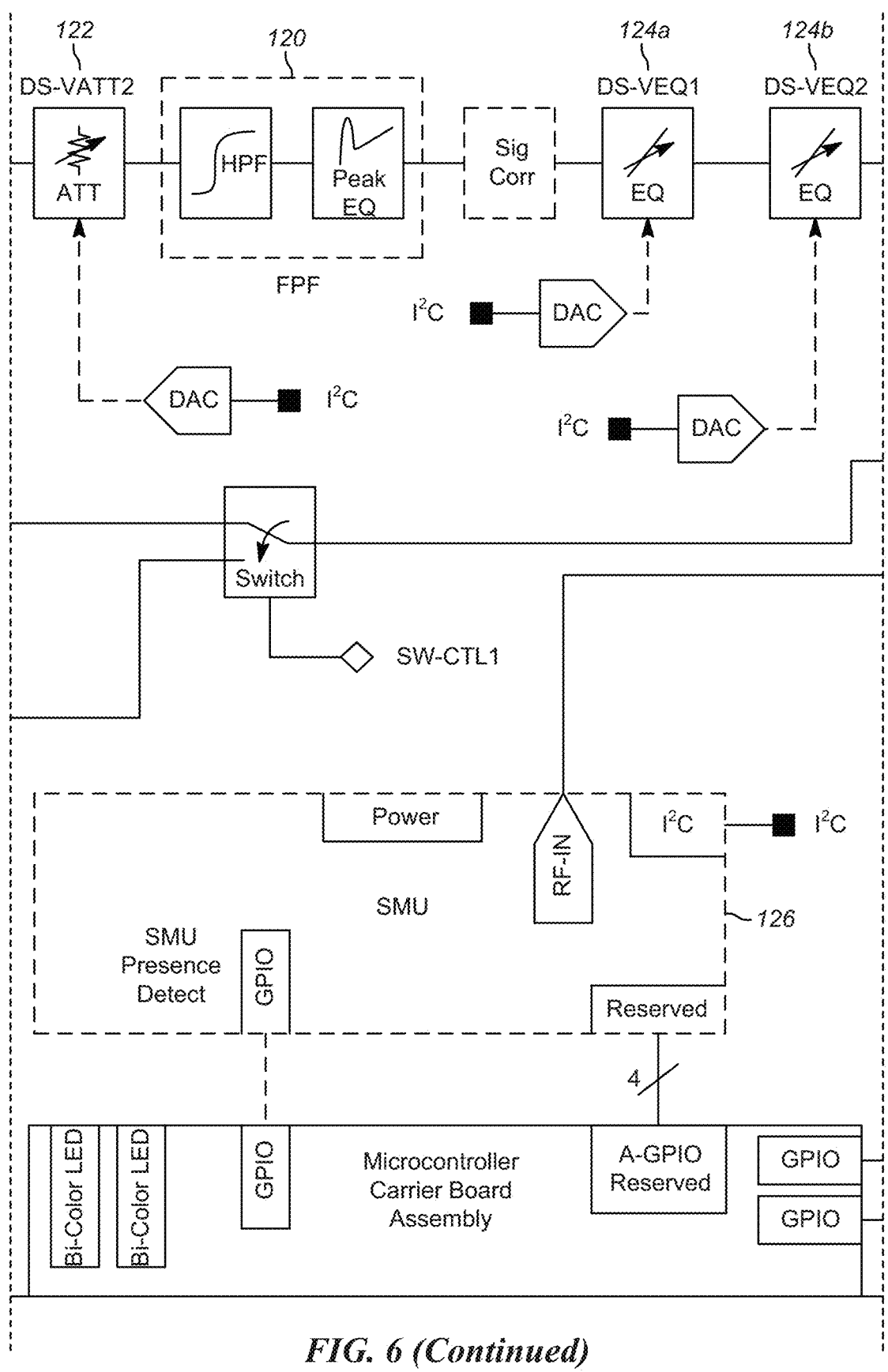
Figure 6:
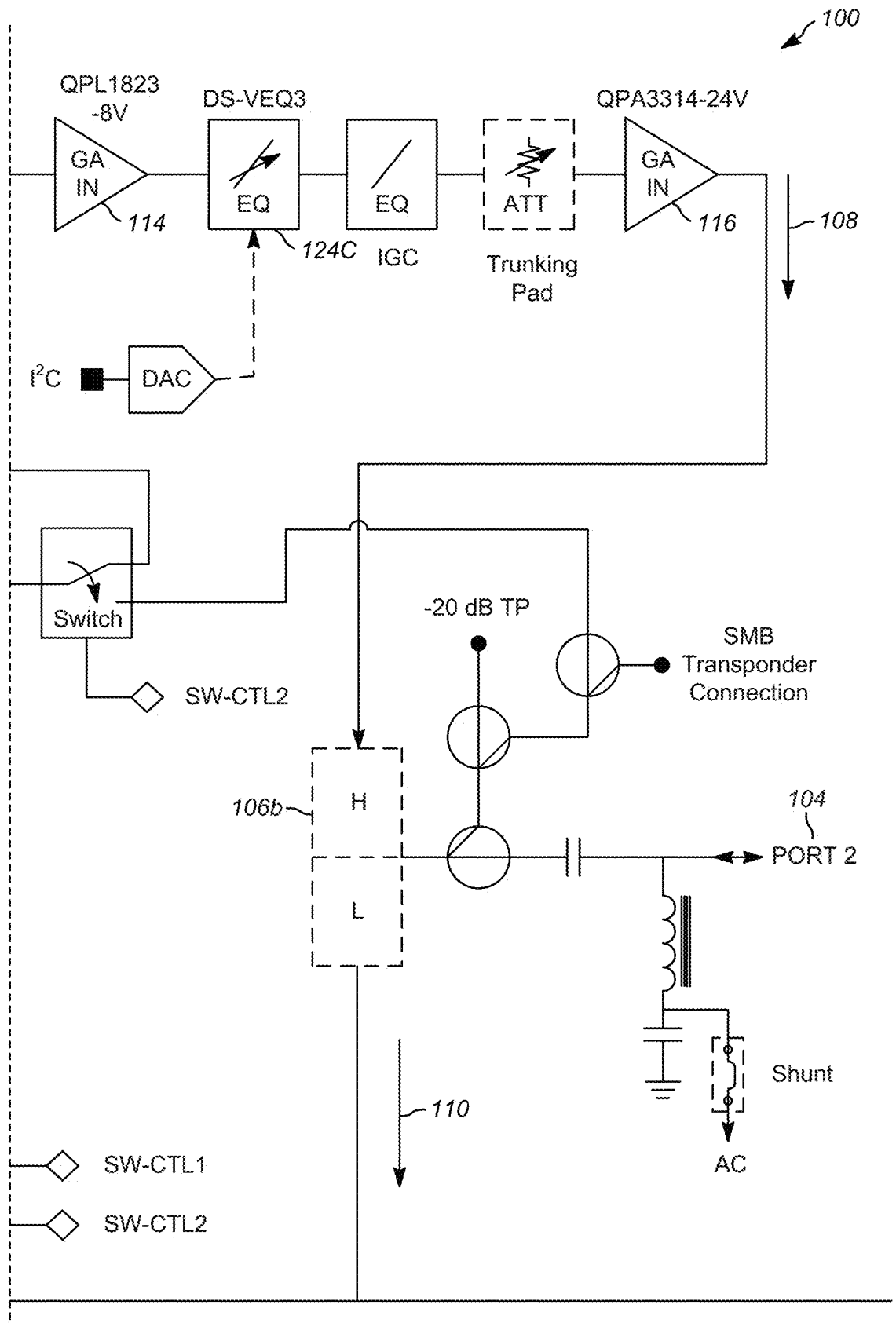

FIG. 6 shows an embodiment of an extended-spectrum amplifier 100 that is better able to achieve unity gain over a much wider range of frequencies than amplifiers that add padding and signal conditioning as just discussed. Specifically, rather than condition and/or pad a signal so as to make a fixed gain amplifier achieve unity gain, the amplifier 100 modulates the gain so that the modulated output of the amplifier is what is needed to provide unity gain, given the adjacent span. Though FIG. 6 shows the components that perform such downstream processing of the amplifier 100, this disclosure will later describe the upstream processing of the amplifier 100 that similarly modulates the gain of the amplifier.

The amplifier 100 may receive a downstream signal at northbound port 102 and output an amplified downstream signal at southbound port 104. The amplifier 100 preferably includes a pair of diplexers 106a, 106b used to separate the downstream signal from the upstream signal and route each through separate paths 108, 110 through the amplifier so that the downstream signal through path 108 may be amplified separately from the upstream signal through upstream path 110.

Downstream Path

Regarding the downstream path 108, the amplifier 100 may preferably include a plurality of separate, successive gain blocks, which may for example include three gain blocks 112, 114, and 116, and which together provide the total amplification of amplifier 100. Amplifier 110 may also include an optional attenuator 118, having the purpose of attenuating the signal by a value just sufficient to prevent clipping of the signal by the amplifier 112 of the first gain block or gain stage of amplifier 100. The amplifier 100 may also preferably include a forward path filter 120 intended to further isolate any crosstalk between the upstream and downstream signals beyond that provided by the diplexer 106a. In some preferred embodiments, the filter 120 is positioned after the first gain block 112.

Between the first or initial gain block 112 that receives a downstream signal to be amplified by amplifier 100 and the final gain block 116 that provides the amplified downstream signal to the southbound port 104, are preferably at least one attenuator 122 and at least one equalizer, such as the three equalizers conditioners 124a, 124b, 124c shown in FIG. 6. As noted earlier, the attenuator(s) 122 and equalizer(s) 124a, 124b, 124c modulate the gain over frequency of the amplifier 100 so as to apply an equal and opposite gain over frequency to that of the preceding span before the amplifier 100.

In some embodiments, this feature may be reflected in the absence of signal conditioning (cable simulation or equalization) in the amplifier 100 outside of the initial gain block 112 and the final gain block 116. Since many modern amplifiers are designed for use in a communications network following locations of a wide variety of span lengths, tap house counts, etc., in some embodiments this feature may more particularly be reflected in the absence of plug-in signal conditioners and/or plug-in attenuators outside of the initial gain block 112 and the final gain block 116, or alternately in the lack of receptacles for plug-in signal conditioners and/or plug-in attenuators outside of the initial gain block 112 and the final gain block 116.

Referring back to the example previously discussed of a hypothetical span loss of 10 dB at 258 MHz and 15.5 dB at 1218 MHz, the amplifier 100 may easily achieve unity gain. Specifically, because there is a 5.5 dB of down-tilt in the loss profile of the span preceding the amplifier 100, in order to compensate for this loss, the equalizers 124a, 124b, 124c are set to a value that adjusts the upwards gain tilt of the amplifier to 5.5 dB. Then the value of the attenuator 122 is set to reduce the open loop gain of the amplifier to be equal to the remaining span loss, after accounting for the tilt adjustment made in the equalizer(s) 124a, 124b, 124c, thereby achieving unity gain.

Figure 7:
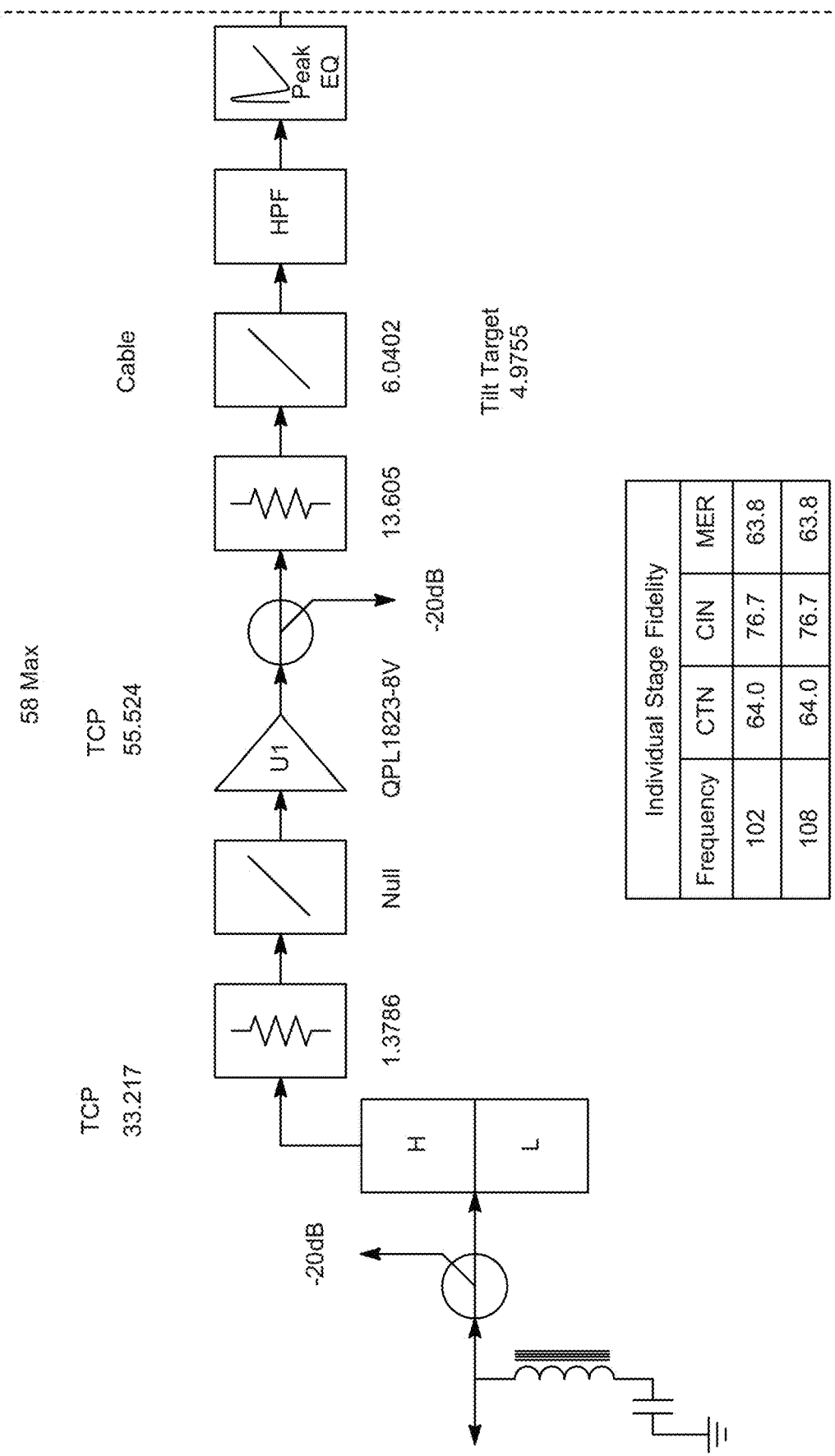
FIG. 7 shows how the amplifier of FIG. 6 is better balanced and has improved performance relative to prior art amplifiers.
Figure 7:
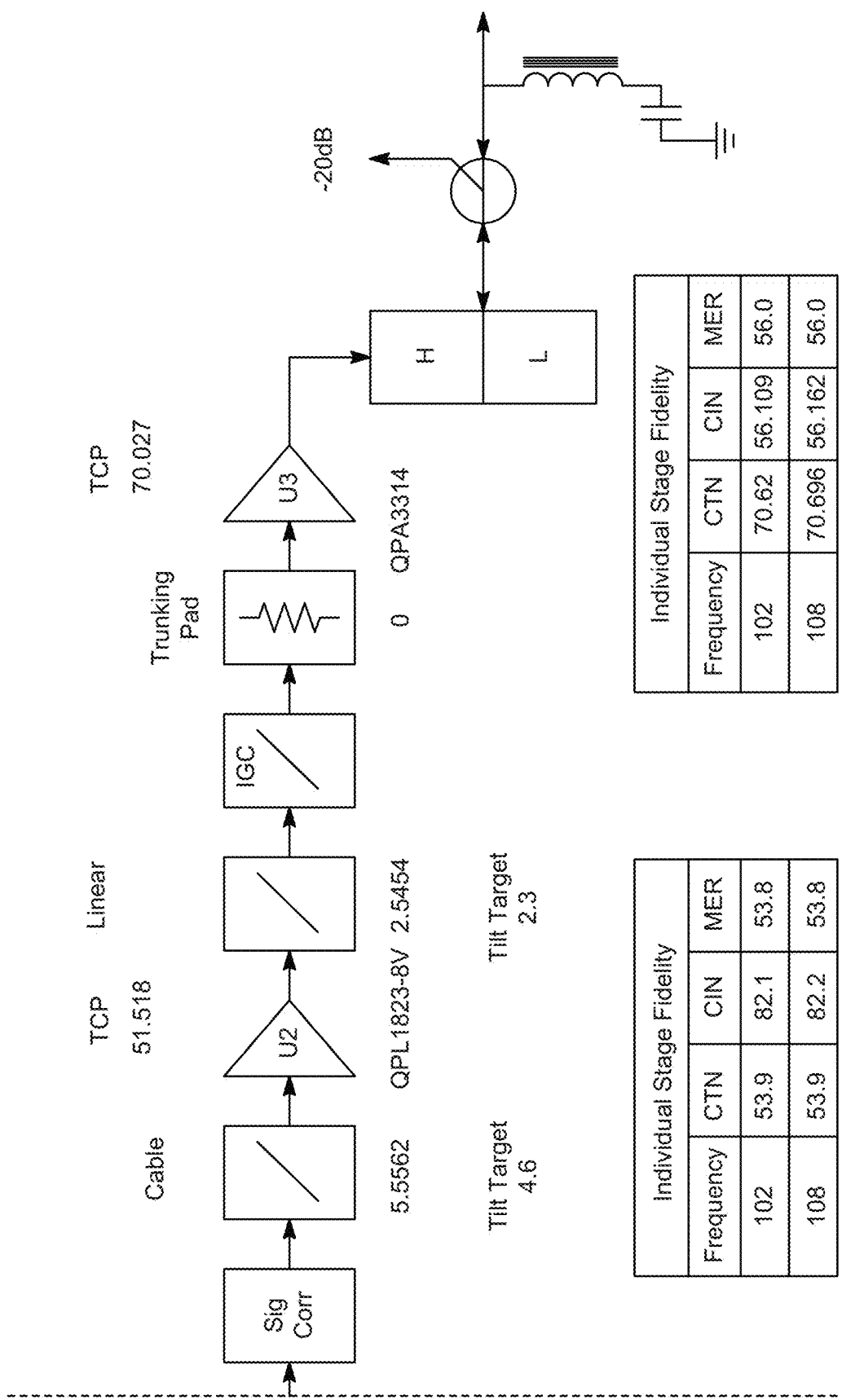

FIG. 7 shows the resulting total composite power (TCP) and noise levels throughout the downstream path through a simulated line extender amplifier that uses the systems and methods of the foregoing disclosure. As can be seen this figure, the total equalization provided by equalizers 124a (6 dB), 124b (5.5 dB). And 124c (2.5 dB) totals 14 dB, and each equalizer is capable of providing up to 13.5 dB limit, hence the provided total equalization is well within the abilities of the amplifier 100. Similarly, the attenuator 122 is providing 13.6 dB of attenuation, meaning that the amplifier is only using approximately 50% of the gain available. This is in marked contrast to the amplifier discussed with reference to FIGS. 2A, 2B, and 3 where there was no attenuation of the signal, meaning that the amplifier would be operating at full amplification and still not attaining unity gain. In contrast, the disclosed amplifier 100 is capable of providing unity gain with tremendous margin.

Although amplifier 100 may in some embodiments only include a single equalizer between the gain blocks 118 and 116, that single equalizer adjusting the tilt of the amplifier as needed to provide unity gain, the amplifier preferably includes a plurality of such equalizers. As shown above, one benefit of multiple such equalizers is that the amplifier 100, in order to achieve unity gain, may need to provide more tilt than any single equalizer could. Moreover, as explained in further detail below, by using a plurality of equalizers, and particularly by positioning equalizers on either side of gain block 114, the shape response of the amplifier as a function of frequency may be controlled in a manner that is not achievable by current amplifiers.

Furthermore, in some preferred embodiments, and again as described later in this specification, the attenuator 122 as well as any or all of the equalizers 124a, 124b, 124c may preferably be variable attenuators controlled by a signal monitoring unit 126 in a manner that, for example, adjusts for changes in span losses due to temperature variations so as to maintain unity gain in spite of such changes.

Upstream Path

In an amplifier cascade that propagates an upstream signal, the architecture is typically designed such that each amplifier is presented with the same upstream input levels at every amplifier or other active element, balanced to a flat target. For example, the system might be designed such that each active element has a flat 11 dBmv/6.4 MHz at its respective upstream input. Because each amplifier is unique, each amplifier is adjusted such that the upstream signal is output to a span at the proper output level in order to provide the next amplifier in the upstream cascade with the flat target at its input.

Accordingly, regarding the upstream path 110 shown in FIG. 6, an upstream signal received at southbound port 104 may also preferably be amplified by the amplifier 100, and the amplified upstream signal may be output onto outbound port 102. Preferably, the amplifier 100 is configured to provide unity gain for the upstream path given the loss characteristics of the same span for which the amplifier 100 provides downstream signal compensation. This will typically require different signal processing than what is done for downstream signal amplification, because as just noted, unlike the downstream signal where unity gain over the downstream spectrum is to be achieved at the southbound port 104 of the amplifier 100 given the loss profile of the span that the downstream signal just traversed, in the upstream direction the objective is to output a signal at the northbound port 102 that will achieve unity gain over the upstream spectrum at the input port of the next upstream amplifier (or other active component), given the loss profile of the span that the upstream signal will traverse to that next upstream amplifier.

For example, referring to FIG. 1, when compensating for the loss profile of the span 11, in the downstream direction the amplifier 14 receives a degraded input signal at its northbound port where the degradation (loss) varies as a function of frequency, and the amplifier 100 is configured to provide unity gain (with a flat power profile) at its output intended to exactly reproduce the signal that existed at the output of the preceding active at the other end of the span 11, in this case the node 12 which should also have such unity gain at its output. In the upstream direction, however, the amplifier receives an input upstream signal at its southbound port exhibiting unity gain with a flat power profile, but outputs an amplified signal with a power profile as a function of frequency that, given the loss profile of span 11, is intended to produce an input at the node 12 that exactly matches the upstream signal that exists at the southbound port of the amplifier 14.

Figure 8:
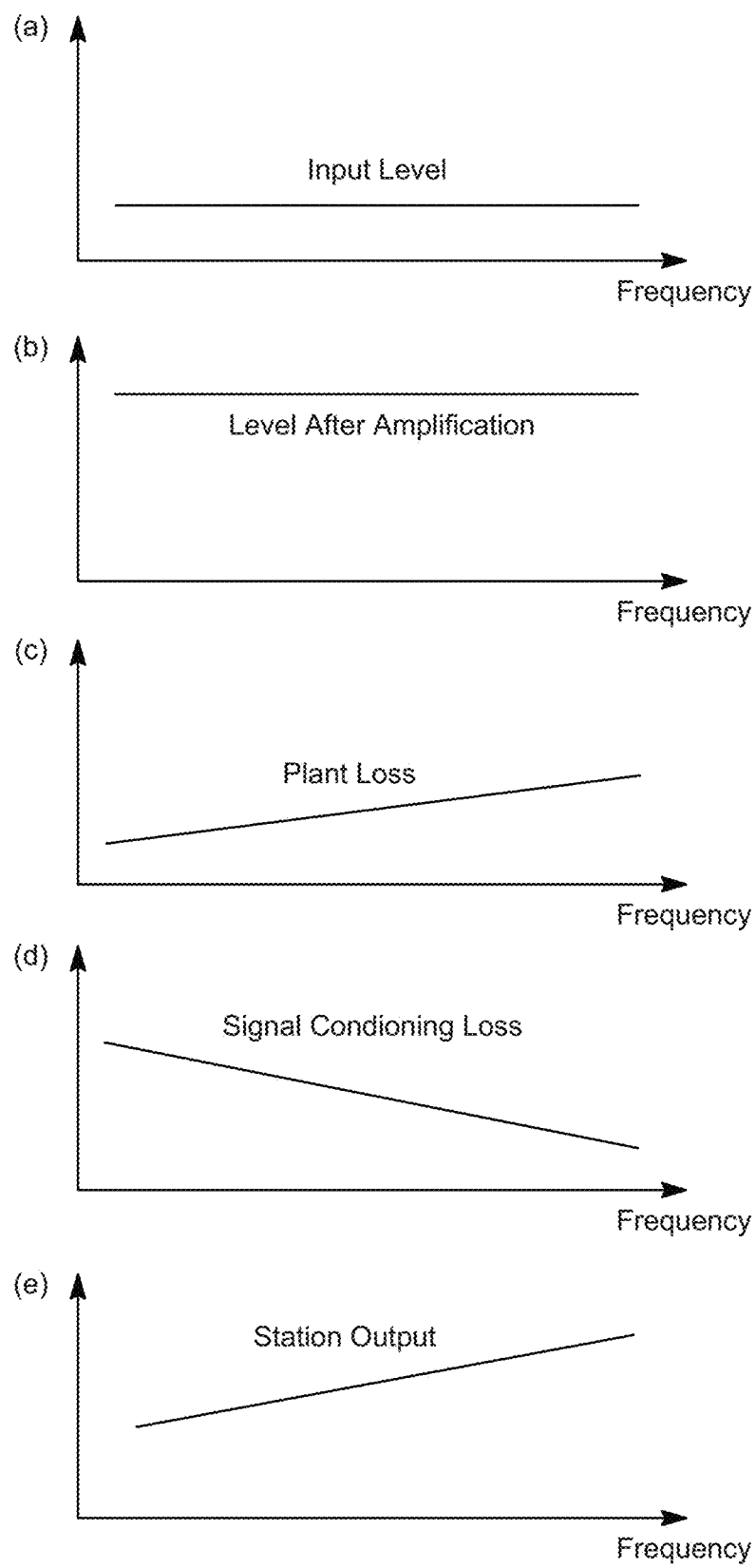
FIG. 8 shows desired signal processing for amplification of upstream signals performed by the amplifier of FIG. 6.

The desired upstream signal processing is illustrated in FIG. 8. The first panel (a) of this figure shows the input power levels at the input to the amplifier 100, i.e. power levels that are flat as a function of frequency. Panel (b) shows those input levels after amplification at the full operational gain of amplifier 100 and panel (c) shows the loss profile of the intervening span between the amplifier 100 and the next amplifier or other active in the upstream path. Panel (e) shows the power levels that are desired at the northbound port of the amplifier 100 in order to achieve unity gain at the next upstream amplifier, given the plant loss shown in panel (c). Panel (d) shows the signal conditioning loss that must be added by the amplifier 100 that will achieve the desired power levels of panel (e) at the next upstream amplifier, given the levels shown in panel (b). Stated differently, the station output is the result of the amplified input shown in panel (b) as modified by the signal conditioning loss of panel (d). The plant or span loss of panel (c) applied to the station output of panel (e) reproduces the desired input level of panel (a) at the next upstream amplifier.

Figure 9:
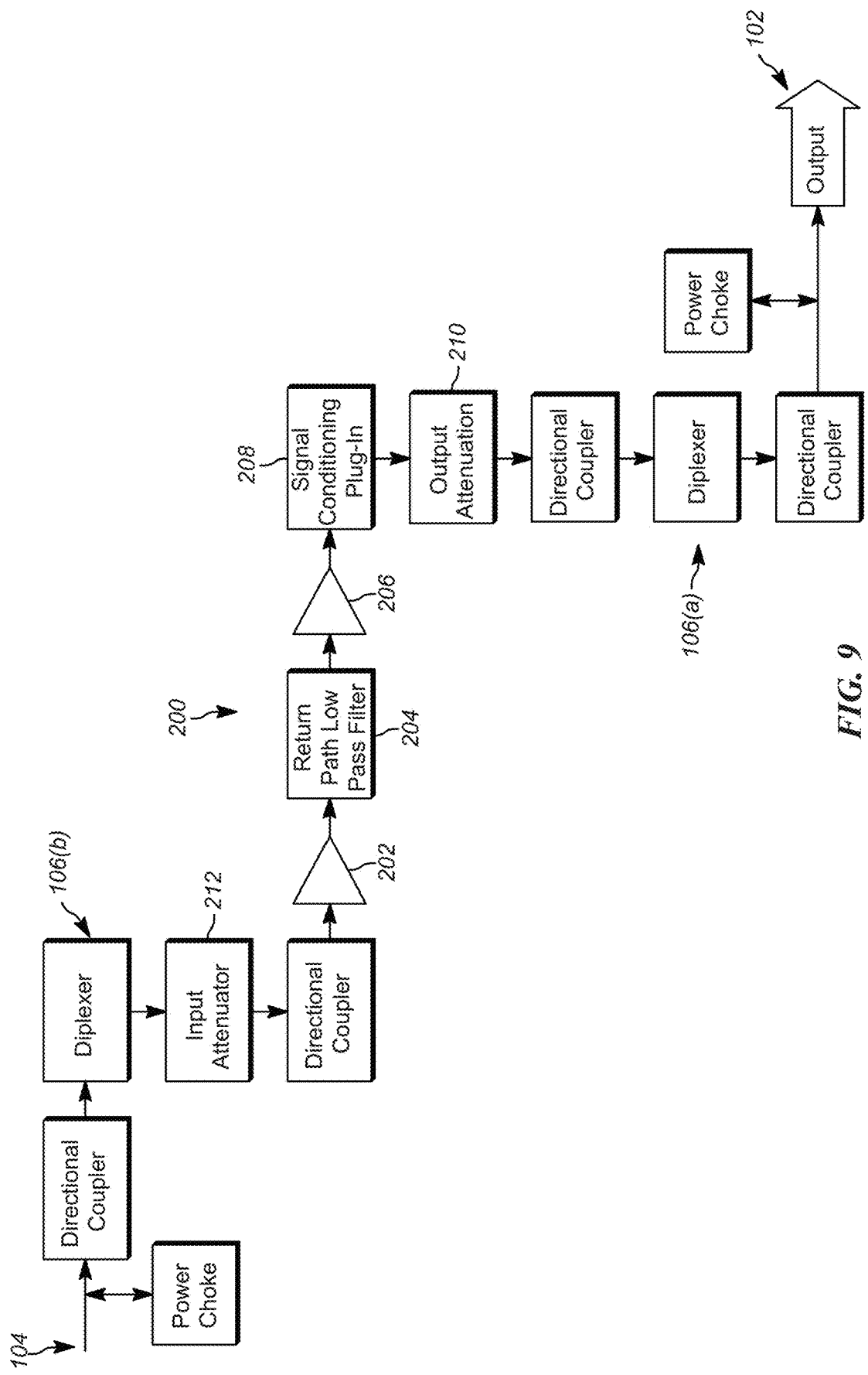
FIG. 9 shows a first exemplary embodiment of upstream amplification logic that achieves the signal processing shown in FIG. 8.

FIG. 9 shows one exemplary embodiment of upstream amplification logic that achieves the signal processing shown in FIG. 8. Specifically, an amplifier such as the amplifier 100 may have a southbound port 104 that receives an input upstream signal as well as a northbound port 102 that outputs an amplified upstream signal. The amplifier 100 may include upstream amplification logic 200 that includes at least two amplifier or gain blocks 202 and 206, where gain block 202 is the first gain block of the amplifier 100 in the upstream direction following diplexer 106(b) that isolates the upstream signal processed by the amplifier 100 from the downstream signal output from amplifier 100, and gain block 206 is the final gain block of amplifier 100 prior to diplexer 106(a) that isolates the upstream signal processed by the amplifier 100 from the downstream signal input to the amplifier 100. Upstream amplification logic 200 may also include a return path filter (RPF) 204 that preferably includes a low pass filter (LPF) that rejects signals above the passband to the upstream signal to improve loop isolation and stability beyond what the diplexers 106(a) and 106(b) provide. Following the final gain block 206, amplification logic 200 may also preferably include a signal conditioning plug-in 208 and an output attenuator 210 together configured to produce the signal conditioning loss profile shown in panel (d) of FIG. 8. Amplification logic may optionally include an input attenuator 212 that slightly adjust the input levels to avoid clipping by the gain blocks 202 and 206.

The use of signal conditioning plug-in 208 and an output attenuator 210 following the final gain block 206 may in some instances successfully achieve unity gain in the upstream direction, even when amplifier 100 is used to amplify upstream extended spectrum (ESD) signals. That is to say, in some embodiments amplifier 100 may include the downstream logic as shown in FIG. 6 and the upstream logic of FIG. 9. However, as already noted previously in this specification, in some instances and particularly where amplifier 100 amplifies upstream ESD signals, the amplification logic of FIG. 9 may not be sufficient to achieve unity gain in the upstream direction because the tilt of span loss is exacerbated by extending the spectrum of a signal, and the needed compensating tilt/attenuation of the amplified signal may be beyond the capabilities of the available plug-in units.

Figure 10:
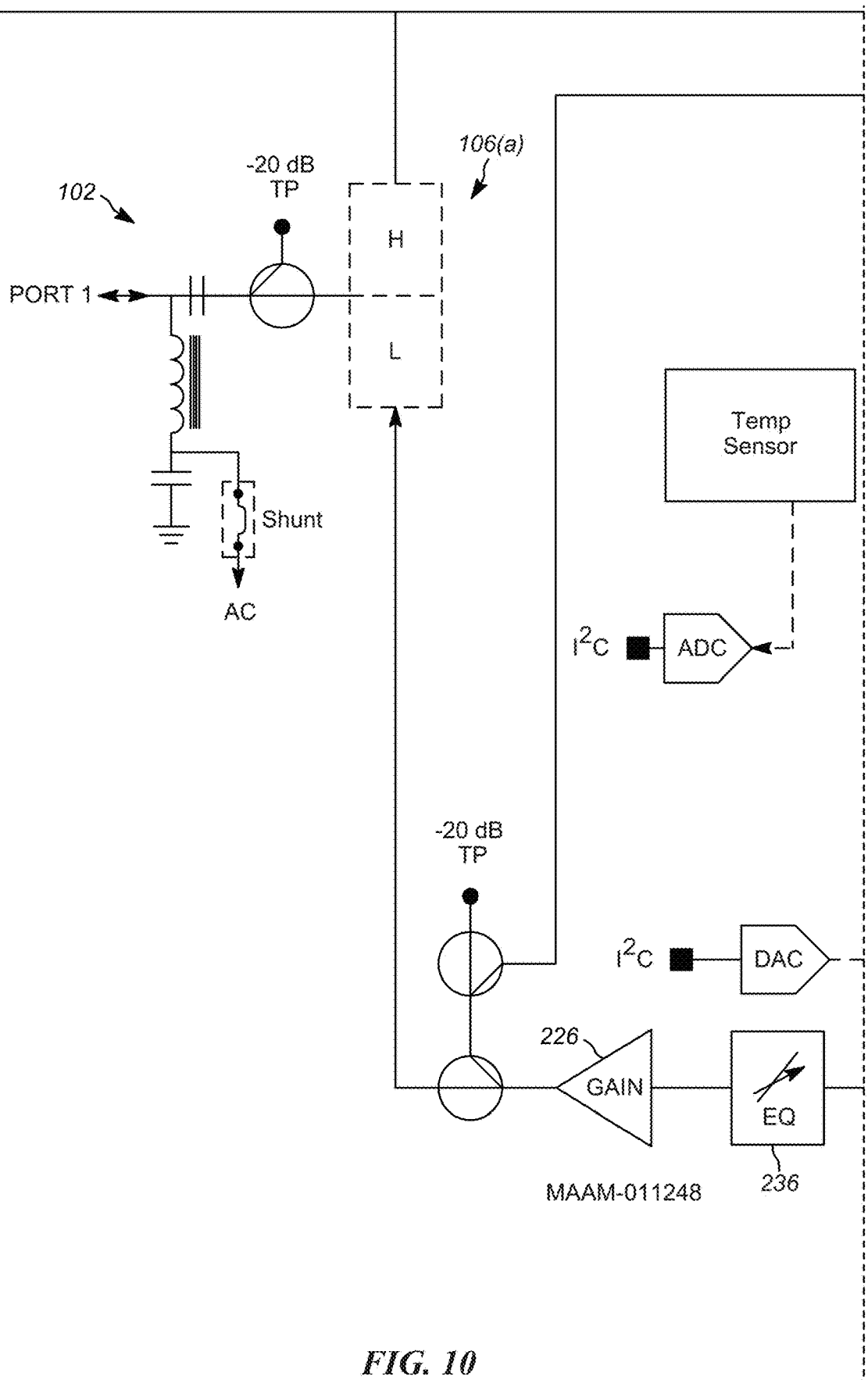
FIG. 10 shows a second exemplary embodiment of upstream amplification logic that achieves the signal processing shown in FIG. 8.
Figure 10:
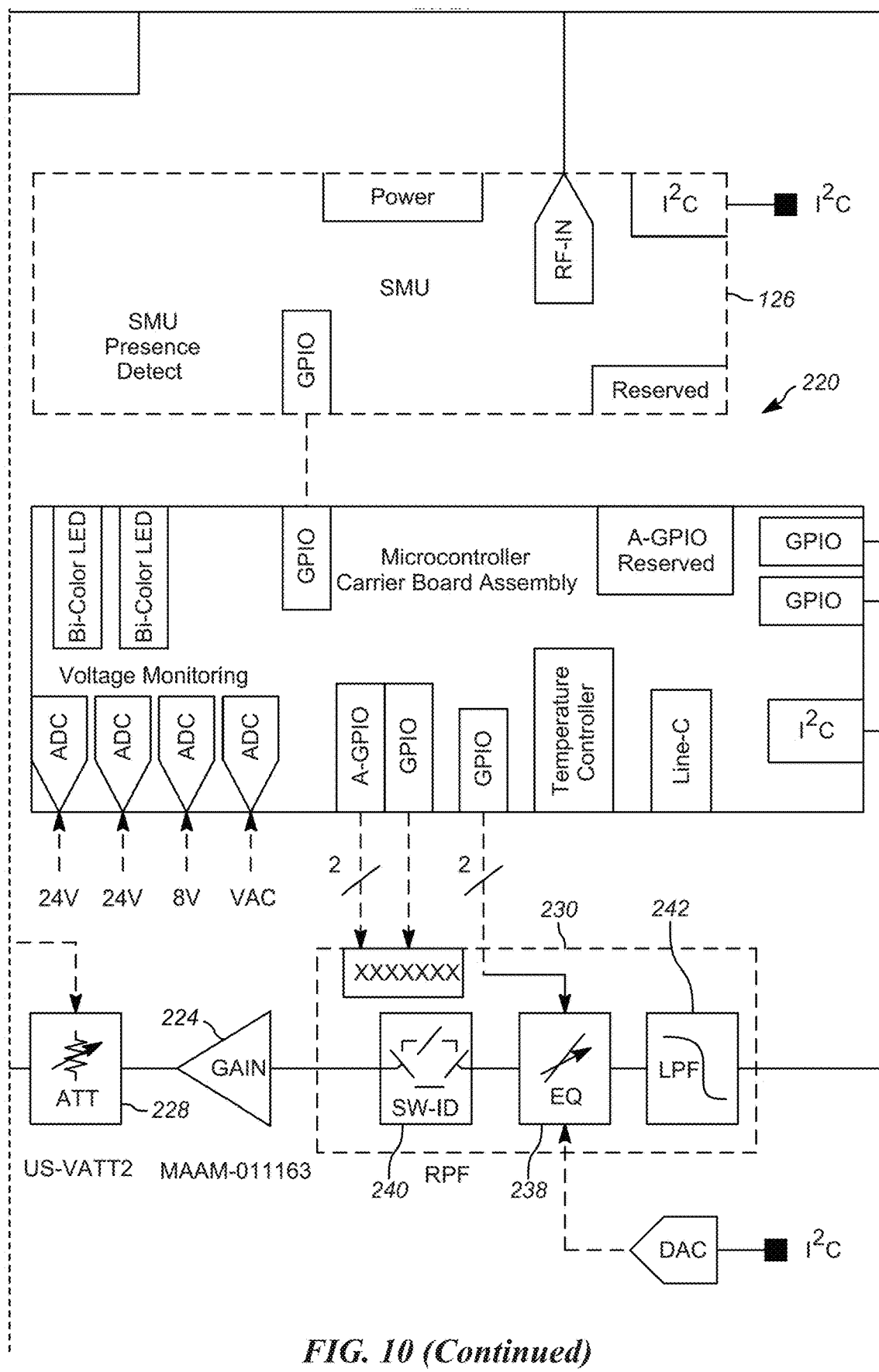
Figure 10:
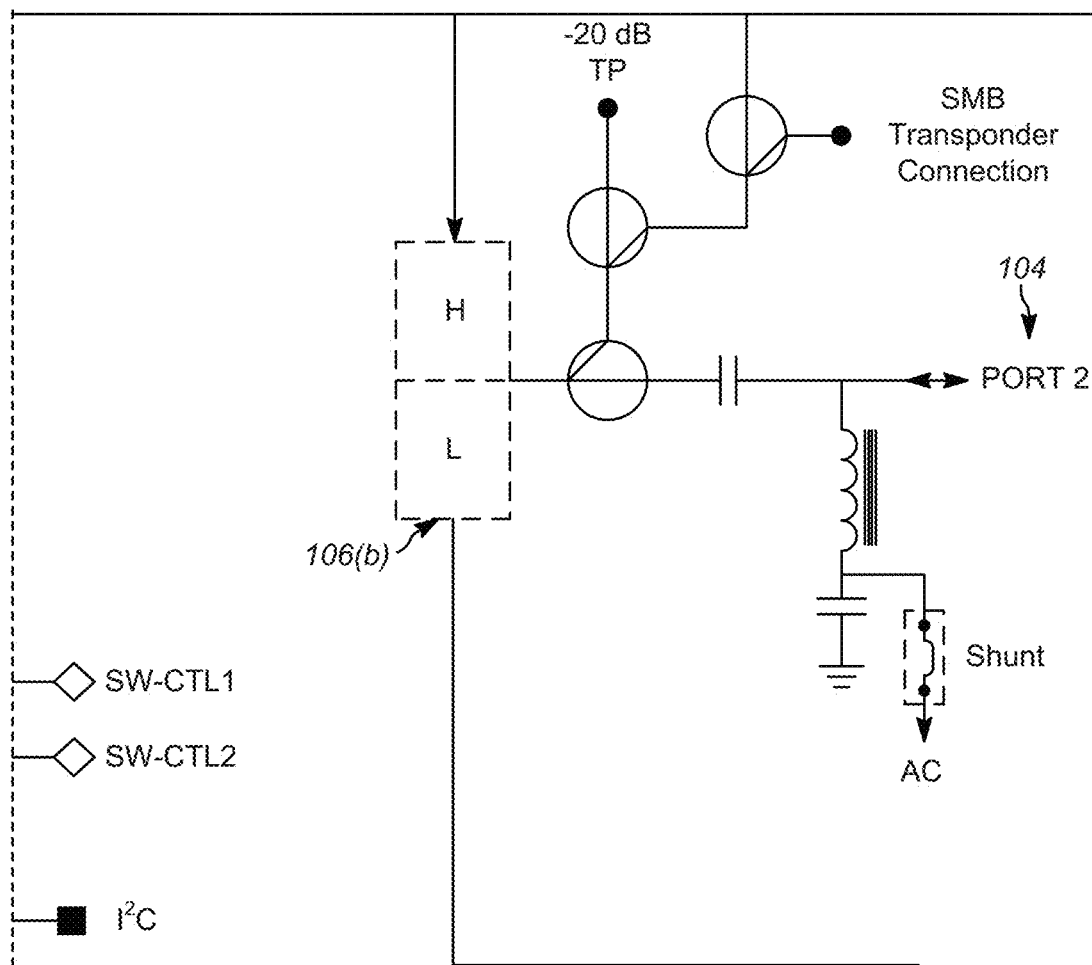
Figure 10:
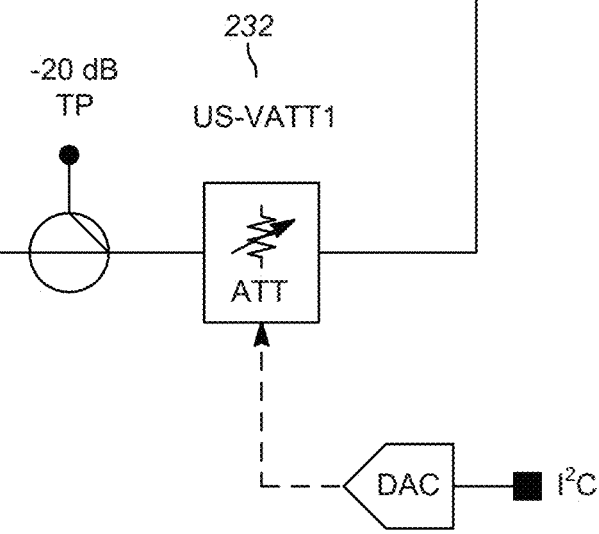

Therefore, some embodiments of the amplifier 100 may include the amplification logic 220 shown in FIG. 10, and as described herein. Specifically amplification logic 220 may include a plurality of gain blocks or amplifiers 222, 224, and 226. Preferably, gain block 222 is the first gain block of the amplifier 100 in the upstream direction following diplexer 106(b) that isolates the upstream signal processed by the amplifier 100 from the downstream signal output from amplifier 100, and gain block 226 is the final gain block of amplifier 100 prior to diplexer 106(a) that isolates the upstream signal processed by the amplifier 100 from the downstream signal input to the amplifier 100.

The amplifier 100 also preferably includes, between gain blocks 222 and 226, at least one variable attenuator such as attenuator 228 as well as at least one equalizer (signal conditioner) such as any, some, or all of equalizers 236, 238, 240 as will be later described in this disclosure. In this manner, rather than condition and/or pad a signal so as to make a fixed gain upstream amplifier provide unity gain to the input of some other upstream amplifier, the amplifier 100 modulates the amplified upstream gain so that the modulated upstream output of the amplifier is what is needed to provide such unity gain, given the adjacent span. As with the downstream signal processing discussed with respect to FIG. 6, this feature may be reflected in the absence of upstream signal conditioning (equalization) and/or upstream attenuation in the amplifier 100 outside of the signal path between gain block 234 and gain block 236. Since many modern amplifiers are designed for use in a communications network following locations of a wide variety of span lengths, tap house counts, etc., in some embodiments this feature may more particularly be reflected in the absence of plug-in signal conditioners and/or plug-in attenuators outside of the gain block 234 and the gain block 236, or alternately in the lack of receptacles for plug-in signal conditioners and/or plug-in attenuators outside of the gain block 234 and the gain block 236.

In some embodiments, the features just described may be provided by a variable attenuator 228 that provides overall level control for upstream amplification, as well as at least one variable equalizer such as equalizer 238 and/or equalizer 240. In a preferred embodiment, the variable equalization is provided within a novel plug-in Return Path Filter (RPF) module 230. Historically, RPFs are merely a simple low-pass filter that rejects signals above the bandpass of the upstream spectrum in order to provide additional loop isolation, and prevent instability. Preferably, RPF 230 includes at least one variable equalizer (signal conditioner) such as one or more of equalizers 238, 240 to provide variable equalization for the amplified upstream signal. More specifically, in some preferred embodiments, RPF 230) may comprise a first variable equalizer 238 that provides a continuously variable amount of equalization (signal conditioning). That is to say that the variable equalizer 238 provides a continuously variable amount of tilt or slope of gain as a function of frequency. Furthermore, in some other preferred embodiments. RPF 230 may comprise a second variable equalizer 240) comprising a switch that alternately routes the upstream signal path between a first equalizer and a second equalizer. In some embodiments, the switched equalizer 240) comprises two alternately selectable fixed equalizers, each having a different amount of tilt. or gain slope as a function of frequency. In other embodiments, the switched equalizer 240 may be implemented as an attenuator with a fixed amount of gain as a function of frequency (equalization of zero), in combination with an equalizer or signal conditioning unit having a fixed amount of tilt. Still other embodiments may implement the switched equalizer 240 as a combination of two fixed attenuators that each have respectively different amounts of attenuation.

Some preferred embodiments of the disclosed RPF 230 may include both the variable equalizer 238 and the switched equalizer 240. The variable equalizer 238 thereby provides dynamic adjustment of gain tilt within a first range, while the switched equalizer 240 provides an offset adjustment of the variable tilt of the equalizer 238. For example, in an embodiment where the switched equalizer alternates between one fixed attenuator with a flat response of 0 dB and a second attenuator with a tilt of 7 dB, and the variable equalizer 238 applies an amount of tilt that changes from 0 dB to 10 dB, the total range of adjustment is 0 dB to 17 dB. Thus, as can be seen by this example, in embodiments where both the equalizers 238 and 240 are included, the equalizer 238 is analogous to an accelerator pedal of a car, while the equalizer 240 is analogous to a gear shift. Those of ordinary skill in the art will appreciate that the equalizer 240 may include more than two equalizers or "gears" as is needed. Those of ordinary skill in the art will also appreciate that other embodiments may implement an RPF 230 that includes more than one variable attenuator 238 and more than one switched attenuator 240.

In some embodiments, the difference in tilt provided by the switched equalizer is less than the range of tilt provided by the variable equalizer. This ensures that the switched filter does not switch too often.

Preferably, the RPF 230 includes a "knee frequency" that is optimized to the upstream/downstream split implemented by the amplifier 100. The "knee frequency" as described in the specification and claims of the present application refers to the frequency at which any variable tilt of an equalizer hinges. That is to say, one equalizer may be designed to apply a range of 0 dB to 7 dB of tilt (difference in attenuation between high and low frequency), beginning at 5 MHz and ending at 684 MHz, while another may be designed to apply a range of 0 dB to 7 dB of tilt beginning at 5 MHz and ending at 204 MHz. In the first instance, the knee frequency is 684 MHz and in the second instance the knee frequency is 204 MHz. The reason that this knee frequency is important is that, in conjunction with the amount of tilt provided by the variable equalizer, the knee frequency determines the maximum amount of span loss that may be compensated for by an amplifier 100 having a specific amount of full operational gain: the higher the knee frequency, the less gain available at a frequency below the knee frequency for a given loss gain tilt profile and the lower the span loss that an amplifier may correct for. The greater the span losses, the greater the needed amplification required to achieve unity gain. If the knee frequency of the equalizer is optimized for a higher frequency than necessary for the span, the less gain will be available at a given loss tilt. Referring to FIG. 8D for example, as the signal conditioning loss slope is shifted to the right, so is the frequency of minimum loss. This means that for any given gain tilt, the signal conditioning losses at frequencies below the minimum loss frequency are increased, resulting in less gain available for compensating for span losses (loss as a function of frequency), i.e., the amplifier fails as shown in FIG. 4.

In some embodiments, the amplifier 100 may include a fixed-tilt equalizer 236 (i.e., not variable) positioned between the final gain block 226 and any preceding gain blocks in the upstream path. Preferably, the fixed-tilt equalizer 236 is employed in amplifiers 100 where a certain minimum amount of equalization or tilt will always need to be provided e.g., with a very high split such as 684 MHZ. This provides a much lower-cost solution that implementing an RPF 230 having more than two equalizer settings in the switched equalizer 240, or providing a very large-range variable equalizer, so as to provide a very large range of equalization. The fixed equalizer 236 may be implemented as a switched equalizer with a high tilt path and a loo tilt path. Also, in some embodiments, the equalizer 236 is separated from the RPF 230 by intermediate gain block 224. Either including the fixed equalizer 236 inside the RPF 230, or positioning it immediately adjacent the RPF 230 would adversely degrade noise performance e.g., Carrier Noise Ratio (CNR) at low frequencies. In other embodiments, the equalizer 236 may be located after the output gain stage 226.

In some preferred embodiments, the amplifier 100 may also include an RPF 230 with a low pass filter 242 that is optimized to the specific split implemented by the amplifier 100. The low pass filter 242 in the RPF 230 may have a cut-off frequency that is aligned to the knee frequency of the variable equalizer 238, providing rejection for frequencies above the knee frequency. The low pass filter 234 provides whatever further attenuation is needed for the amplifier 100 to reject signals above the bandpass of the upstream spectrum in order to provide additional loop isolation and prevent instability.

As with the downstream direction, the variable attenuation and equalization provided by the attenuator 228 and the equalizers 238 and 240 may be controlled by the SMU 126. in a manner that, for example, Thus, the SMU 126 may preferably adjust for changes in span losses due to temperature variations so as to maintain unity gain in spite of such changes. This preferably eliminates the need for a Bode circuit to compensate for temperature variations.

As can be appreciated by the foregoing disclosure, the upstream architecture of the amplifier 100 as just described minimizes total composite power (TCP) that the output gain stage need to operated at and, unlike legacy amplifiers, gain and signal conditioning of the amplifier 100 in the upstream direction are set between amplifier blocks or stages, allowing each amplifier block to operate with the best possible distortion performance as well as the lowest possible TCP. This distribution of gain control withing the amplifier 100 beneficially maintains performance and does not limit the fidelity of the signal by wither Carrier to Thermal Noise (CTN) or Carrier to Intermodulation Noise (CIN).

In some embodiments, a Digital-to-Analog Converter (DAC) may be included to control the variable equalizer(s) and/or an Electrically Erasable Programmable Read-only Memory (EEPROM) may be included in the RPF 230 to store information about the implemented split and the response shape of the equalizers 238 and 240.

Booster Amplifier

In addition to standard amplifiers such as multiport Mini-Bridger (MB) and Line Extender (LE) amplifiers, the Extended Spectrum DOCSIS specification provides for low cost, low gain booster amplifiers to support the upgrade of spans where a simple drop-in of a higher bandwidth amplifier is not sufficient for meeting Quality of Service (Qos) requirements of subscribers. Preferably, such booster amplifiers should have a fixed upstream/downstream gain as well as be power and cost optimized using low-power and low-TCP upstream/downstream gain blocks. Furthermore, such booster amplifiers should preferably not require (or include) any thermal compensation or power control, nor should they cost-burden or otherwise impede the standard, primary multi-port and single port amplifiers in the system.

The variability in loss that occurs in a span due to e.g., temperature fluctuations increases with the length of the span, and this variability must be compensated for. When a booster with fixed gain is added to the span, the effective loss of the span is reduced, however, the variability in loss due to temperature is increased. This is because temperature changes not only affect the cable, but also affect the performance of the amplifiers in the span, including that of any added booster amplifiers. In addition, the booster amplifier allows the primary station amplifier to support spans with more cable and passive elements than it could otherwise, resulting in an increase in the variability of loss over temperature. All this increased variability must be handled by the primary station amplifier because the low-cost requirements for the booster amplifier prevent such booster amplifiers from including expensive components to perform thermal compensation. Stated differently, the booster amplifier must not only provide the additional amplification required for a desired upgrade, but also must provide further amplification to allow the primary amplifiers to have sufficient gain reserve to compensate for the increase in the variability of span losses caused by the addition of the booster amplifier itself. Any design of a booster amplifier must be evaluated against such requirements, else the cost of the increase in gain reserve required in the primary amplifiers may outweigh the benefit of the booster.

To illustrate required specifications of a potential booster amplifier, the present inventors evaluated a sampling of twelve existing node designs, which consisted of a mixture of 860 MHz, 870 MHz, and 1 GHz designs, and included a total of 307 amplifiers and 942 total spans. Across these networks, a total of thirteen spans were found to fail after performing a like-for-like drop-in upgrade of amplifiers to upgrade the span to support a higher bandwidth of 1.8 GHz i.e., MB amplifiers were replaced with 1.8 GHz MB amplifiers, LE amplifiers were replaced with 1.8 GHz LE amplifiers, etc. These thirteen failed spans accounted for 1.4% of the total upgraded spans and included 4.2% of the total active elements in the upgraded spans.

Figure 11A:
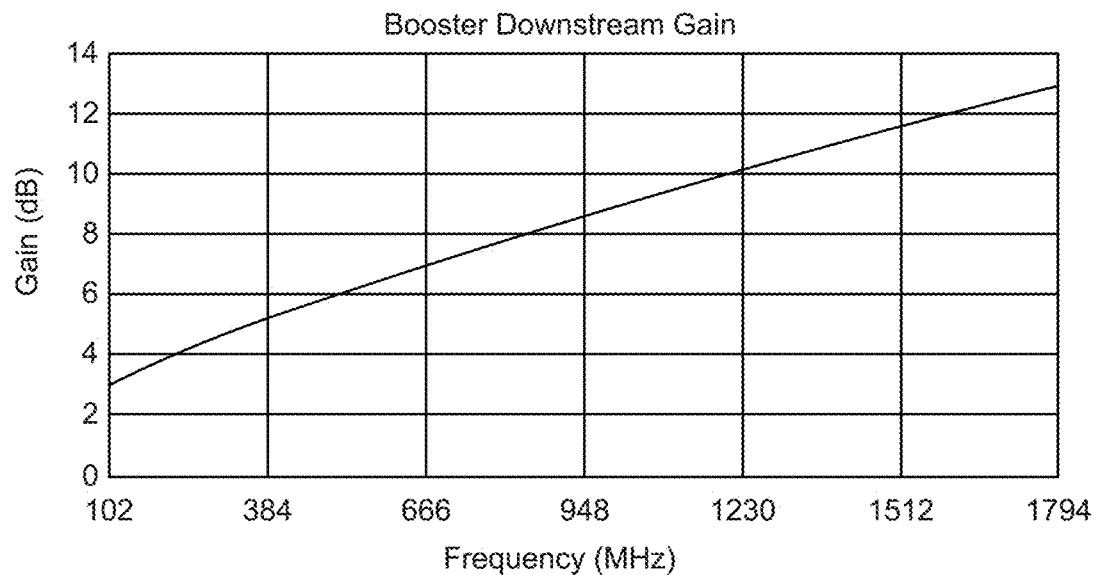
FIGS. 11A and 11B show downstream and upstream gain tilt curves as a function of frequency for an exemplary booster amplifier having a maximum Total Composite Power (TCP) output of 55 dBmV.
Figure 11B:
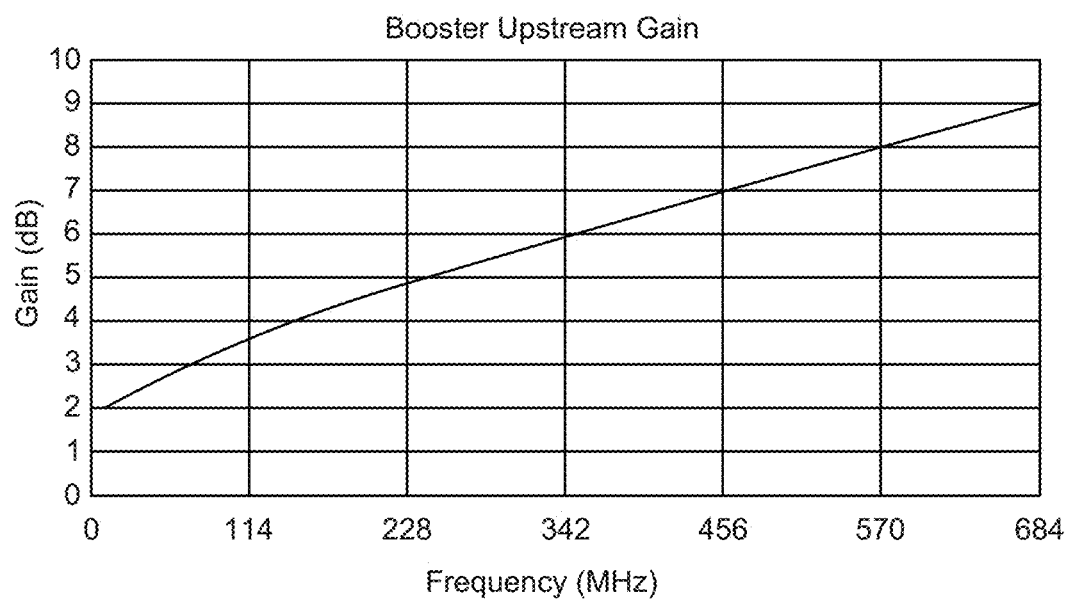

These failed spans, along with worst-case legacy full express spans, were used to determine specifications for an exemplary booster amplifier that would back-off the gain and gain tilt of the primary amplifiers in the failed spans a sufficient amount so as to compensate for the additional thermal variability of the upgraded span. Specifically, FIGS. 11A and 11B show the upstream and downstream gain tilts, respectively, of such an exemplary booster amplifier, which has a maximum TCP output of 55 dBmV.

In addition to the foregoing considerations, the present inventors realized that booster amplifiers should preferably permit flexibility in their placement. This is a critical consideration, because the booster amplifiers contemplated by the DOCSIS specification must rely on placement within the plant span to manage the input and output levels such that neither the upstream nor downstream levels are too high and introduce signal clipping, or so low as to cause degrades carrier-to-thermal-noise performance. Therefore, it is essential that any successful booster design allows for a range of installation locations within the network span that satisfies both the upstream and downstream signal level operating requirements.

Figure 12:
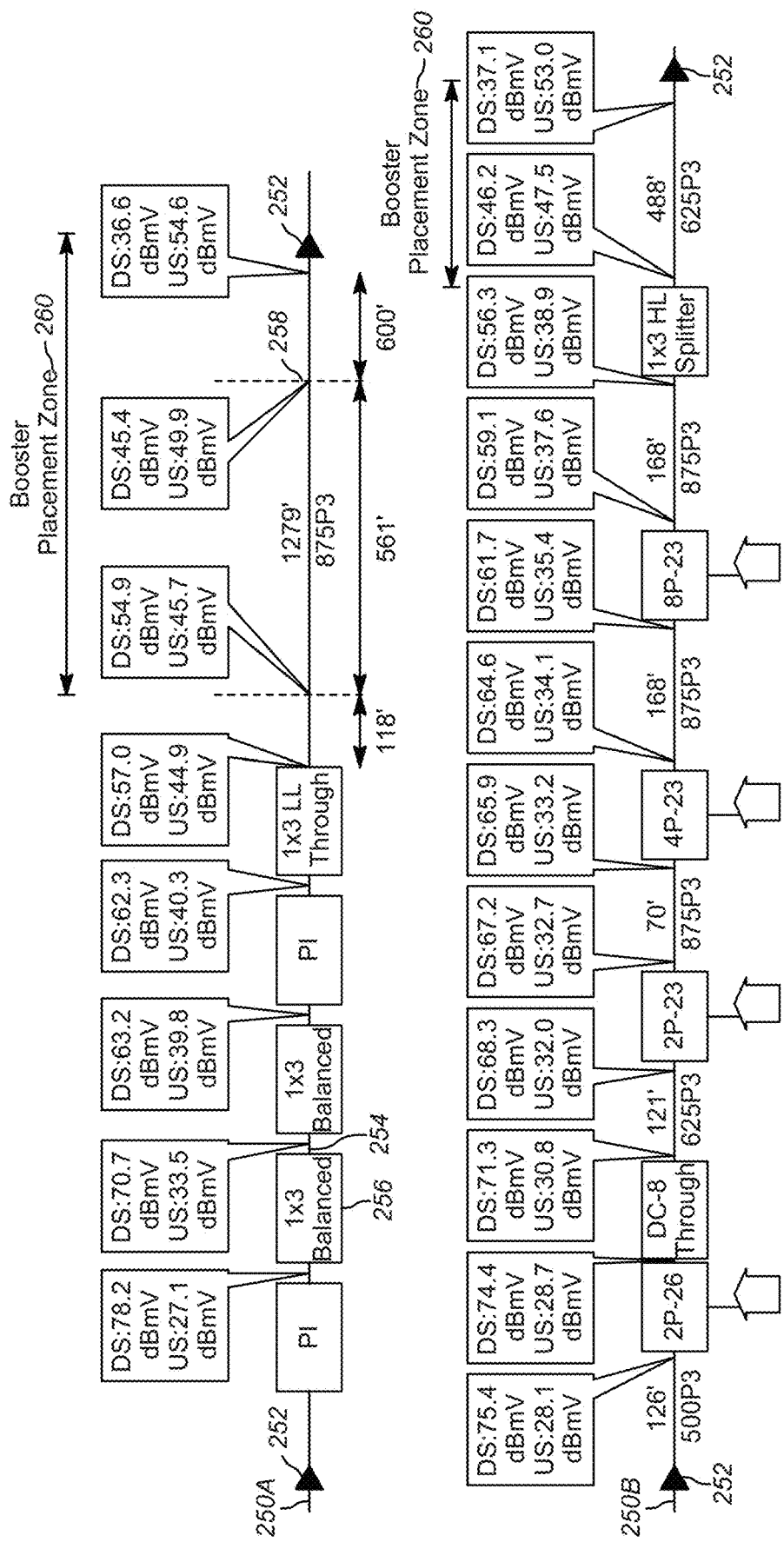
FIG. 12 shows potential booster amplifier placement zones for two exemplary spans of a communications network.

FIG. 12. for example, shows two exemplary spans 250A and 250B where a booster amplifier is required to upgrade a span with mini-bridger (MB) amplifiers 252 to Extended Spectrum DOCSIS (ESD). To understand the range of locations where a booster can be installed the upstream and downstream, booster power levels for every possible installation point within the span were calculated. The upstream TCPs were calculated for a worst-case 492/606 split, while downstream TCPs were calculated for 102 MHZ-1.8 GHz. As can be seen in this figure, if a booster amplifier were placed at location 254 of span 252 following the balanced 1×3 splitter 256, the booster amplifier would only require a TCP output level 33.5 dBmV in the upstream direction, well within the 55 dBmV design of the booster amplifier of FIGS. 11A and 11B. In the downstream direction, however, the booster amplifier would require 70.7 dBmV TCP, well beyond the capabilities of that booster amplifier. Conversely, if the booster amplifier were placed at location 258, between the 561-foot length of 875P3 cable and the 600-foot length of 875P3 cable, both the upstream and downstream TCP requirements fall within the specifications of the booster amplifier. As can be seen in span 252, a booster placement zone 260 may represent the location along a span for which a booster amplifier may be placed given its capabilities.

The present inventors also realized, however, that the mere theoretical existence of a place in the network where a booster amplifier may be successfully located may not be sufficient. For example, though the span 250A of FIG. 12 shows a relatively large booster placement zone comprising multiple locations within 1279 feet of cable, span 250B of that figure shows a much more restrictive booster placement zone. Furthermore, even though several locations may theoretically exist within the 488 feet of the booster placement zone 260 of span 250b, in reality a booster might not actually be able to be placed in that zone. For example, there are times when the plant design may not match the actual deployed network. Still other situations may arise where a cable plant operator lacks an easement or other access to the particular location in which the booster placement zone sits, or portions of the booster placement zone. This can lead to a potential placement for a booster amplifier that works on paper, but results in significant overload distortion which in turn may require a technician to remove the booster, resplice the cable, and find a new location to install the booster.

Figure 13A:
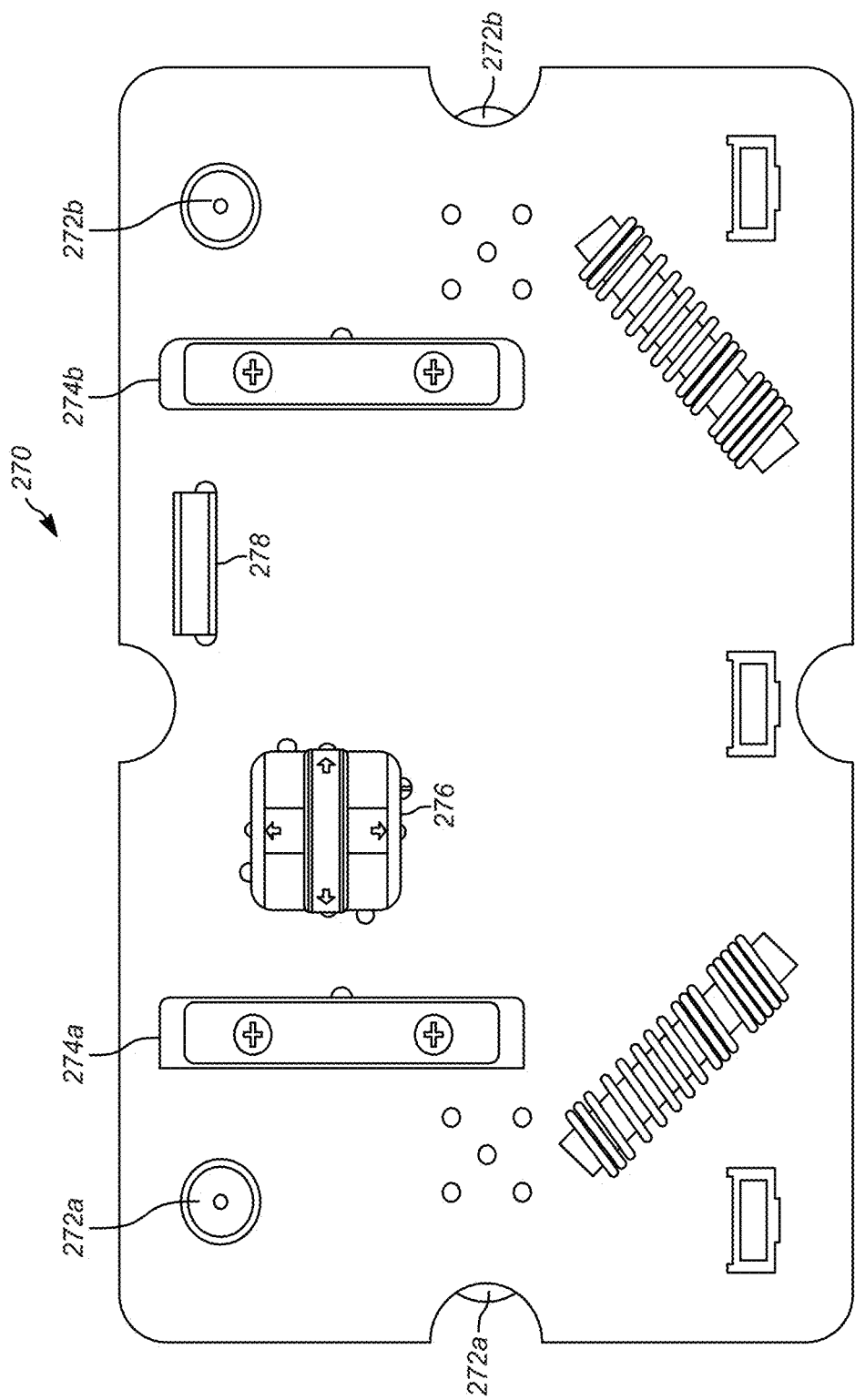
FIG. 13A shows an exemplary top view of a circuit board for an input plugin to a booster amplifier in accordance with some embodiments of the present disclosure, having an adjustable attenuator.
Figure 13B:
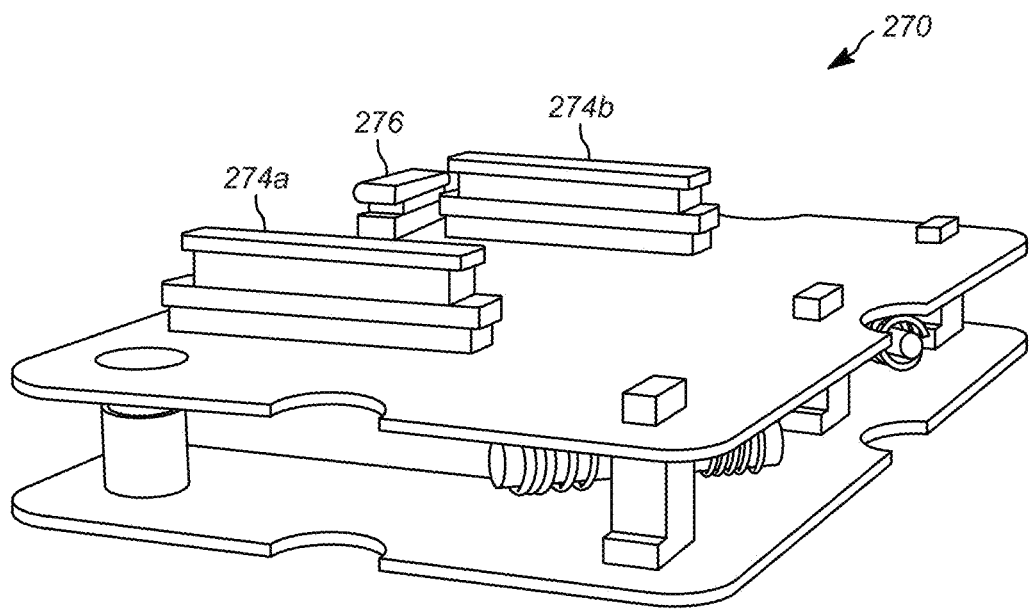
FIG. 13B shows a perspective view of the input plug-in of FIG. 13A.

FIGS. 13A and 13B show a novel input module 270 for a booster amplifier. Specifically, the module 270 may comprise an input port for receiving an input signal to the plug-in 270 and an output port that outputs a signal to the amplification stage of a booster amplifier. Between ports 272a and 272b are diplexers 274a and 274b that isolate a downstream signal from an upstream signal. The input module 270 also preferably includes an attenuator 276 and a signal conditioner (equalizer) 278 that attenuate and condition, respectively, the downstream signal prior to that signal being output for amplification by a booster amplifier that includes the module 270. In some embodiments, the input module 270 is a plug-in module that may be inserted and/or removed from a slot or other electrical receptacle of a booster amplifier. Furthermore, those of ordinary skill in the art will appreciate that some embodiments of the input module 270 may have an attenuator 276 but no signal conditioner 278.

As can easily be appreciated, the disclosed input module 270 allows a technician or plant operator to configure a booster amplifier to have different characteristics by selectively adding attenuation and/or signal conditioning to the input of a booster amplifier, and in doing so will expand the booster placement zone 260. For example, by selectively inserting the input module 270 into a booster amplifier and adding sufficient attenuation, the booster placement zone 260 of span 250b as seen in FIG. 12 may be expanded leftwards, providing more options for placement. Those of ordinary skill in the art will also appreciate from FIG. 12 that, although booster amplifiers may typically be expected to fail in the downstream direction, in some circumstances failure may occur in the upstream direction, hence some embodiments of the input module 270 may also include attenuation/signal conditioning in the upstream direction as well as the downstream direction.

In a preferred embodiment, the attenuator 276 and/or the equalizer 278 are plug-in modules that may selectively and alternately inserted into, and removed from, the input module 270. This beneficially allows adjustability of the amount of attenuation/signal conditioning performed by the input module 270. As one example, a technician may have several available attenuators/signal conditioners and may simply select and insert the appropriate one for a given location in a span, or best one by trial and error.

Figure 14:
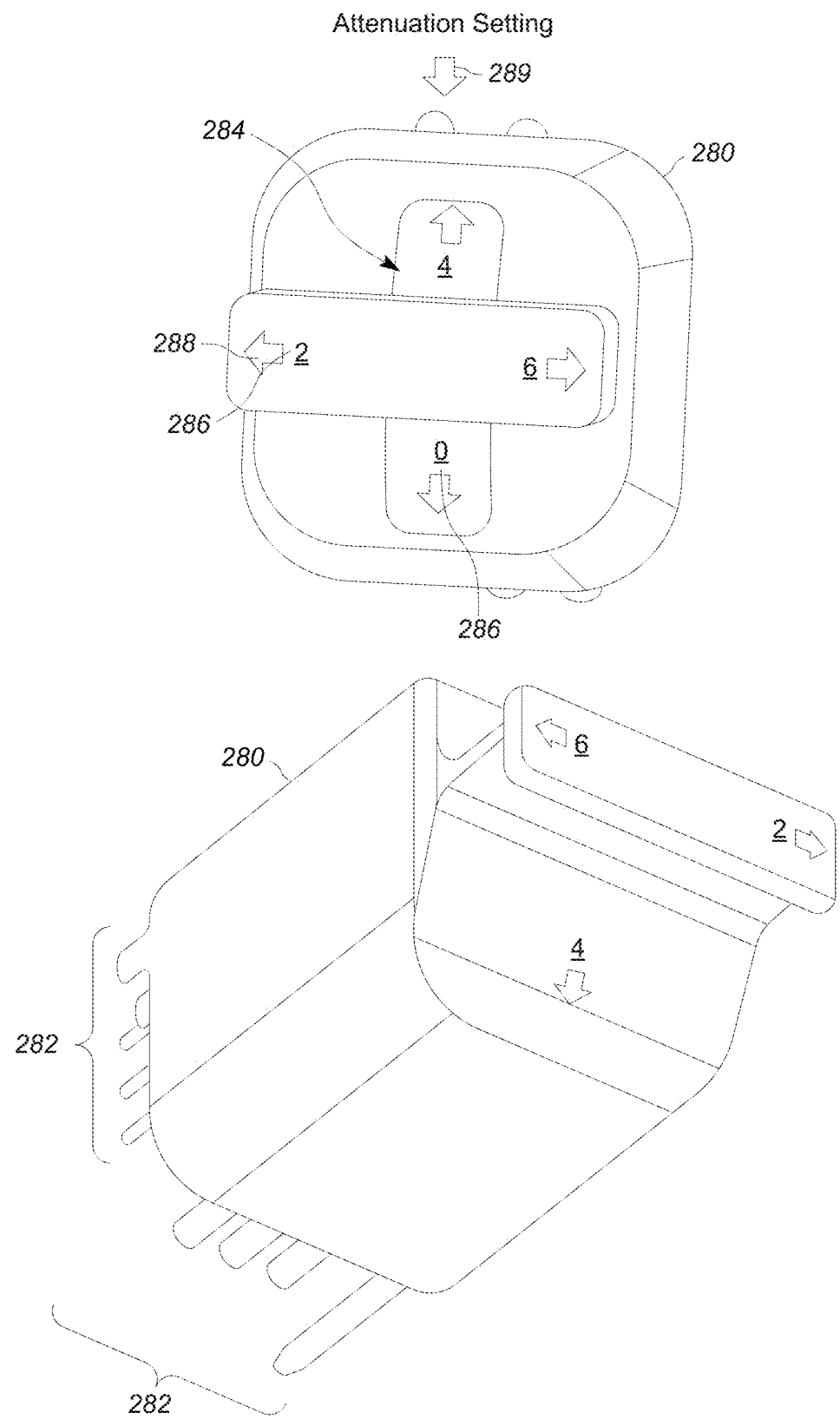
FIG. 14 shows top and perspective views of the adjustable attenuator of FIGS. 13A and 13B.

Furthermore, in other preferred embodiments a single attenuator 276 may itself provide an adjustable range of attenuation. Referring specifically to FIG. 14 for example, the attenuator 276 may comprise an insert 280 having a plurality of interfaces 282 that allow the insert 280 to be secured into the input module 270 in one of a plurality of different orientations, where each orientation provides a different amount of attenuation. For example, the insert 280 may selectively provide either 0 db, 2 dB, 4 dB, or 6 dB of attenuation depending on which of four different orientations that the insert 280 is secured into the input module 270. In some embodiments, the interfaces 282 conform to the JXP 3-pin form factor.

Preferably, the insert 280 and/or the input module 270 includes markings, such as an arrow, a dot, etc. that indicate the orientation of insertion to achieve a specified amount of attenuation. Thus, for example, FIG. 14 shows an insert 280 with a legend 284 displaying the incremental amount 286 of attenuation for each possible orientation, as well as one or more guides 288 by which a technician knows the proper orientation associated with each of these displayed amounts. Similarly, the input module 270 may have a complementary guide 289 that aligns with a selected one of the guides 288.

The insert 280 provides numerous benefits. First, it provides a robust and reliable method for a technician to adjust an input amount of attenuation to a booster amplifier and thereby expand the zone in which a booster amplifier may be placed in a span. Furthermore, the insert 280 reduces or eliminates the need for a technician to carry many different JXP plugins.

Figure 15:
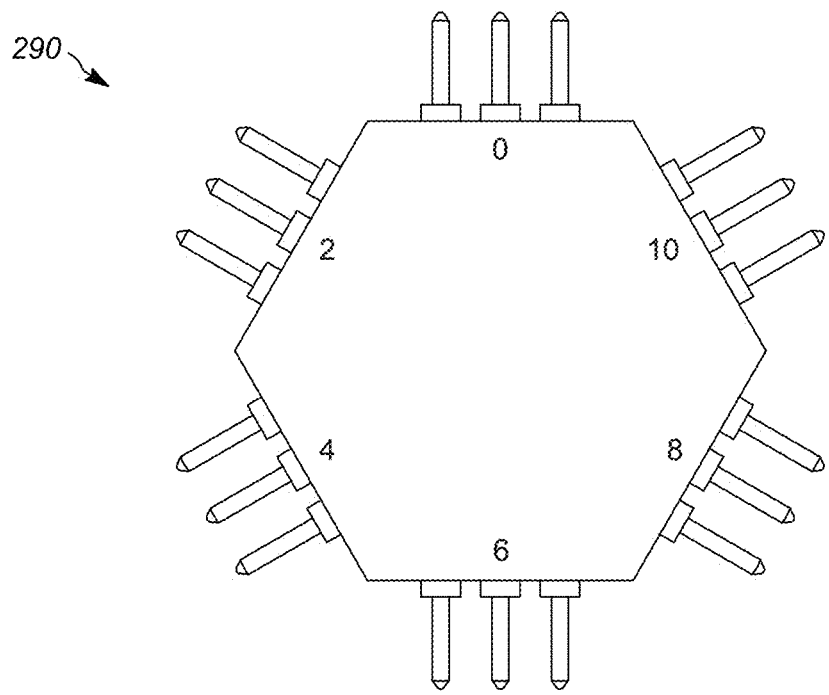
FIGS. 15 and 16 each show respectively different alternate embodiments to the adjustable attenuator of FIGS. 13A and 13B.
Figure 16:
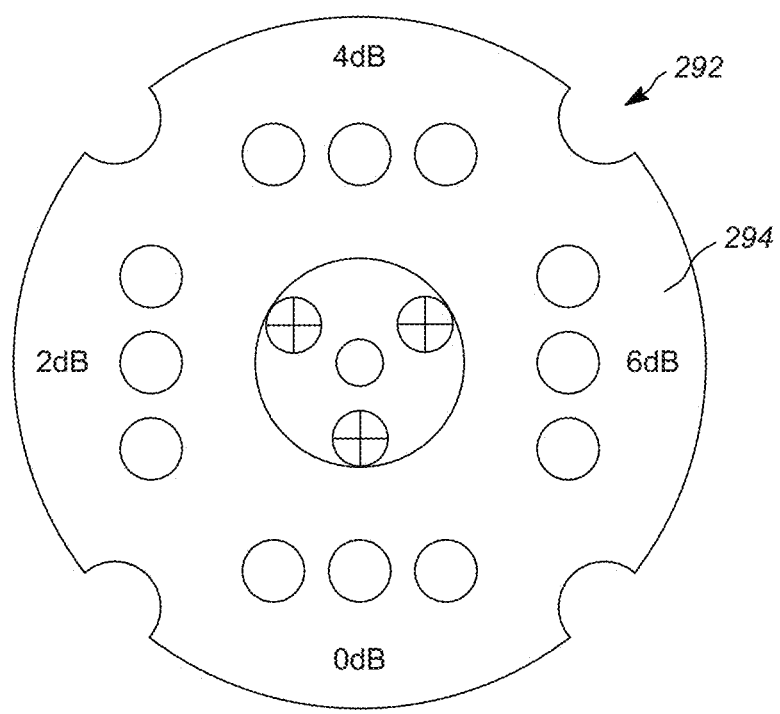

Those of ordinary skill in the art will also appreciate that many different configurations of the insert 280 are possible, as are many different ranges and/or gradations of attenuation. For example, FIG. 15 shows an alternate, hexagonal shaped insert 290 having a range of 0 dB-10 dB in six 2 dB increments. FIG. 16 similarly shows a dial-type insert 292 that has a range of 0 dB-6 dB in 2 dB increments. In still further embodiments, an insert may not need to be removed in order to adjust the attenuation, as variable attenuation may be implemented by a knob, dial, or other such mechanism.

It will be appreciated that the invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

The invention claimed is:

1. An amplifier having a northbound port and a southbound port and positioned adjacent a span of a transmission medium that propagates a signal to be amplified by the amplifier, the span causing a loss profile of the propagated signal specified by a magnitude of loss that varies as a function of frequency, the amplifier comprising:
a first gain block proximate the northbound port and a second gain block proximate the southbound port, the first and second gain blocks together arranged along a signal path of the amplifier; and
a respective attenuator and a respective equalizer, each positioned between the first and second gain blocks, and together configured to modify at least one of a tilt and a gain of the amplifier so as to be equal and opposite the loss profile of the span;
wherein the signal path of the amplifier between the first gain block and the second gain block is at least one of (1) free from receptacles that receive a plug-in cable simulator and (2) free from a plug-in cable simulator needed to achieve unity gain of the amplifier.

2. The amplifier of claim 1, wherein the amplifier is designed to achieve unity gain.

3. The amplifier of claim 1, wherein the signal path of the amplifier is a downstream path.

4. The amplifier of claim 1, wherein the signal path of the amplifier is an upstream path.

5. The amplifier of claim 1 wherein the signal path of the amplifier between the first gain block and the second gain block is free from receptacles that receive said plug-in cable simulator.

6. The amplifier of claim 1 wherein the signal path of the amplifier between the first gain block and the second gain block is free from said plug-in cable simulator needed to achieve unity gain of the amplifier.

7. A method of amplifying a signal, received by a first amplifier and propagated by a span of cable adjacent the first amplifier, the span of cable causing a loss tilt comprising a signal power as a function of frequency, the method comprising:
amplifying the signal by a first gain block and thereafter attenuating the amplified signal by a first magnitude; and
equalizing the attenuated and amplified signal to provide an equalized signal having an amplifier tilt of a second magnitude, and amplifying the attenuated and amplified signal by a second gain block;
wherein the first magnitude and the second magnitude together cancel the loss tilt caused by the span of cable;
wherein a signal path between the first gain block and the second gain block is at least one of (1) free from receptacles that receive a plug-in cable simulator and (2) free from a plug-in cable simulator needed to achieve unity gain of the amplifier.

8. The method of claim 7 wherein the first magnitude and the second magnitude together modulate the gain of the first amplifier to be equal and opposite the loss tilt.

9. The method of claim 7 wherein the amplified signal is an upstream signal.

10. The method of claim 7 wherein the amplified signal is a downstream signal.

11. The method of claim 7 wherein the span of cable separates the first amplifier from a second amplifier, and the first magnitude and the second magnitude are selected to achieve unity gain at an input of the second amplifier.

12. The method of claim 7 wherein the first magnitude and the second magnitude are selected to achieve unity gain at an output of the first amplifier.

13. The method of claim 7 wherein the step of equalizing the attenuated and amplified signal is performed by successive equalizers.

14. The method of claim 7, wherein the first amplifier is free from simulating an additional length of cable along the span of cable.

15. An amplifier having a northbound port and a southbound port, the amplifier comprising:
a first gain block proximate the northbound port and a second gain block proximate the southbound port, the gain blocks together arranged along a signal path of the amplifier; and
at least one first receptacle configured to receive a respective attenuator, and at least one second receptacle configured to receive a respective equalizer, the at least one first receptacle and the at least one second receptacle positioned between the first gain block and the second gain block;

wherein the signal path of the amplifier between the first gain block and the second gain block is free from a receptacle for a plug-in cable simulator needed to achieve unity gain of the amplifier.

16. The amplifier of claim 15, wherein the signal path of the amplifier is a downstream path.

17. The amplifier of claim 15, wherein the signal path of the amplifier is an upstream path.

18. The amplifier of claim 15, wherein the amplifier is including successive receptacles for different said respective equalizers.

* * * * *